(12) United States Patent
Ma et al.

(10) Patent No.: US 8,545,730 B2
(45) Date of Patent: Oct. 1, 2013

(54) ELECTROCONDUCTIVE CARBON FIBRIL-BASED INKS AND COATINGS

(75) Inventors: Jun Ma, Burlington, MA (US); Alan B Fischer, Cambridge, MA (US); Chunming Niu, Palo Alto, CA (US); Lein Ngaw, Lowell, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 7 days.

(21) Appl. No.: 13/325,560

(22) Filed: Dec. 14, 2011

(65) Prior Publication Data

US 2012/0153235 A1 Jun. 21, 2012

Related U.S. Application Data

(63) Continuation of application No. 10/517,748, filed as application No. PCT/US03/19068 on Jun. 16, 2003, now Pat. No. 8,083,970.

(60) Provisional application No. 60/388,616, filed on Jun. 14, 2002.

(51) Int. Cl.
*H01B 1/04* (2006.01)
*H01B 1/24* (2006.01)

(52) U.S. Cl.
USPC ........ 252/500; 252/502; 252/511; 423/447.1; 423/445 B; 977/742; 977/752; 524/495; 524/496

(58) Field of Classification Search
USPC ............. 252/500, 502, 506, 508; 423/447.1, 423/447.2, 447.3, 447.7, 445 B; 524/495, 524/496; 428/408
See application file for complete search history.

(56) References Cited

U.S. PATENT DOCUMENTS

| | | | |
|---|---|---|---|
| 4,280,888 A * | 7/1981 | Bush et al. ............... 522/81 |
| 4,663,230 A | 5/1987 | Tennent |
| 4,855,091 A | 8/1989 | Geus et al. |
| 5,098,771 A | 3/1992 | Friend |
| 5,110,693 A | 5/1992 | Friend et al. |
| 5,165,909 A | 11/1992 | Tennent et al. |
| 5,171,560 A | 12/1992 | Tennent |
| 5,286,415 A | 2/1994 | Buckley et al. |
| 5,424,054 A | 6/1995 | Bethune et al. |
| 5,456,897 A | 10/1995 | Moy et al. |
| 5,500,200 A | 3/1996 | Manderville et al. |
| 5,569,635 A | 10/1996 | Moy et al. |
| 5,578,901 A | 11/1996 | Blanchet-Fincher et al. |
| 5,611,964 A | 3/1997 | Friend et al. |

(Continued)

FOREIGN PATENT DOCUMENTS

| | | |
|---|---|---|
| EP | 0482513 B1 | 8/1995 |
| JP | 7102197 A | 4/1995 |

(Continued)

OTHER PUBLICATIONS

Bening and McCarthy, "Surface Chemistry of Fibrillar Carbon," Polymer Preprints ACS Div. of Polymer Chem., 30 (1), p. 420 (1990).

(Continued)

*Primary Examiner* — Stanley Silverman
*Assistant Examiner* — Kallambella Vijayakumar
(74) *Attorney, Agent, or Firm* — Laura Lee

(57) ABSTRACT

Provided are inks and coatings including carbon nanotubes.

20 Claims, 13 Drawing Sheets

SEM images of fibril ink coating surface morphologies.

(56) References Cited

U.S. PATENT DOCUMENTS

| | | | |
|---|---|---|---|
| 5,691,054 | A | 11/1997 | Tennent et al. |
| 5,707,916 | A | 1/1998 | Snyder et al. |
| 5,853,877 | A * | 12/1998 | Shibuta .................. 428/357 |
| 5,877,110 | A | 3/1999 | Snyder et al. |
| 5,897,695 | A * | 4/1999 | Mayo et al. ............. 106/31.75 |
| 5,908,585 | A * | 6/1999 | Shibuta .................. 252/506 |
| 5,965,470 | A | 10/1999 | Bening et al. |
| 6,031,711 | A | 2/2000 | Tennent et al. |
| 6,099,965 | A | 8/2000 | Tennent et al. |
| 6,106,599 | A | 8/2000 | Breton et al. |
| 6,143,689 | A | 11/2000 | Moy et al. |
| 6,183,714 | B1 | 2/2001 | Smalley et al. |
| 6,280,697 | B1 | 8/2001 | Zhou et al. |
| 6,358,878 | B1 | 3/2002 | Moy et al. |
| 6,422,450 | B1 | 7/2002 | Zhou et al. |
| 6,630,772 | B1 | 10/2003 | Bower et al. |
| 6,872,681 | B2 | 3/2005 | Niu et al. |
| 7,060,241 | B2 | 6/2006 | Glatkowski |
| 7,108,841 | B2 | 9/2006 | Smalley et al. |
| 7,118,693 | B2 | 10/2006 | Glatkowski et al. |
| 2003/0026754 | A1 | 2/2003 | Clarke et al. |
| 2003/0042833 | A1 | 3/2003 | Trujillo et al. |
| 2003/0090190 | A1 | 5/2003 | Takai et al. |

FOREIGN PATENT DOCUMENTS

| | | |
|---|---|---|
| WO | 8907163 A1 | 8/1989 |
| WO | 9105089 A1 | 4/1991 |
| WO | 9507316 A1 | 3/1995 |
| WO | 9618059 A1 | 6/1996 |
| WO | 9906618 A1 | 2/1999 |
| WO | 0026138 A1 | 5/2000 |

OTHER PUBLICATIONS

Guo, T., et al., "Catalytic growth of single-walled nanotubes by laser vaporization," Chem. Phys. Lett., vol. 243: Issues 1-2, pp. 49-54 (1995).

Iijima, S., "Helical microtubules of graphitic carbon," Nature 354:56-58 (1991).

Journet et al., "Large-scale production of single-walled carbon nanotubes by the electric-arc technique," Nature, 388:756-758 (1997).

Thess, A., et al., "Crystalline Ropes of Metallic Carbon Nanotubes," Science, 273:483-487 (1996).

Vigolo, et al., "Carbon Nanotubes Macroscopic Fibers and Ribbons of Oriented Science," Science 290:1331-1334 (2000).

Weaver, J.H., "Totally Tubular," Science 265, pp. 611-612 (1994).

* cited by examiner

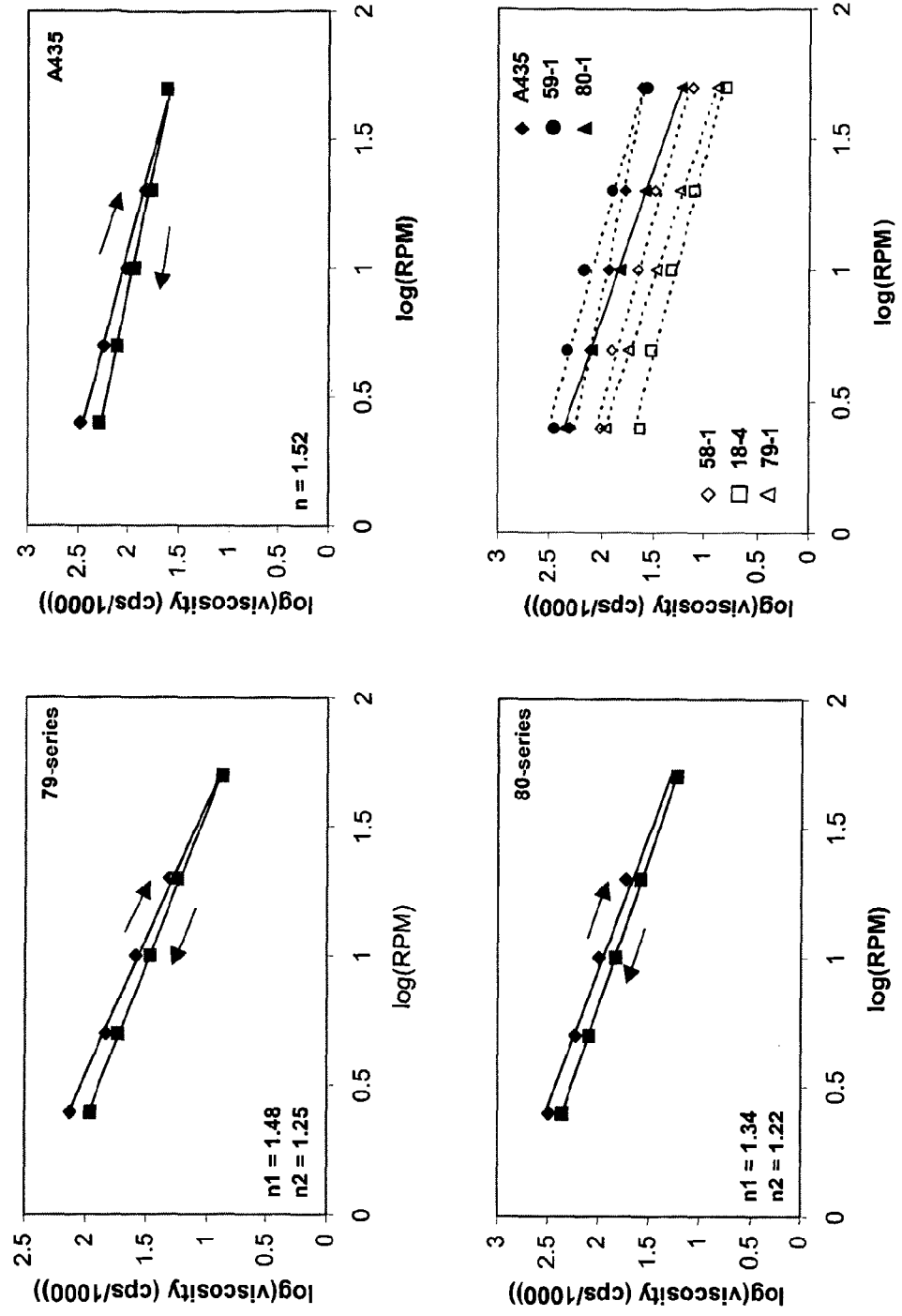

Figure 2 Relative viscosity vs shear (Brookfield spindle speed)
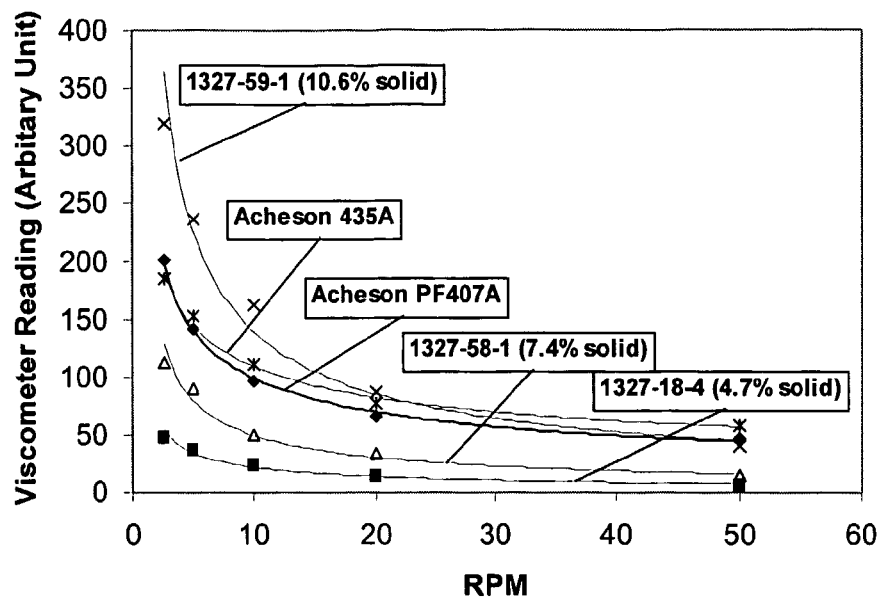
(a) Comparison of commercial (Acheson) and fibril based inks
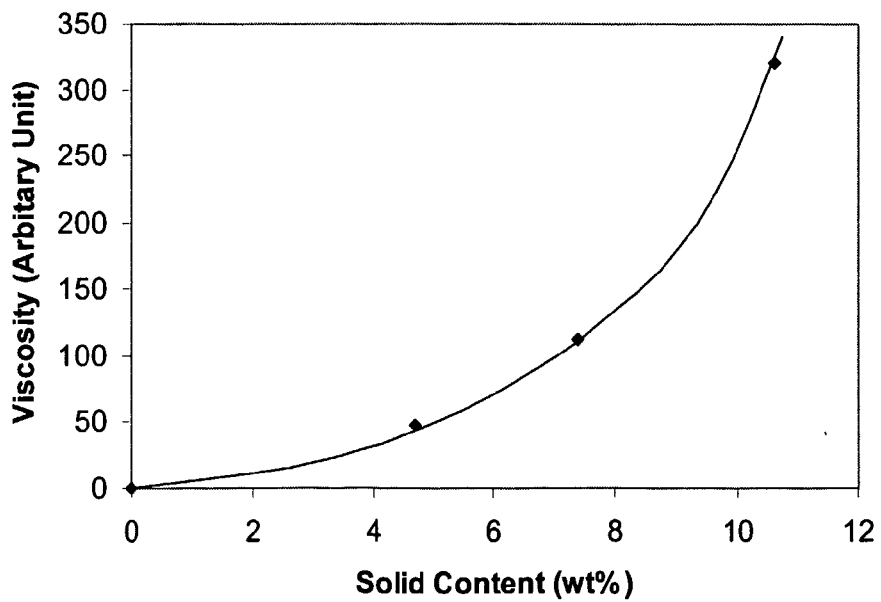
(b) Relative viscosity vs total solid content for 1:2 fibrils to binder

Figure 3  Binder viscosity
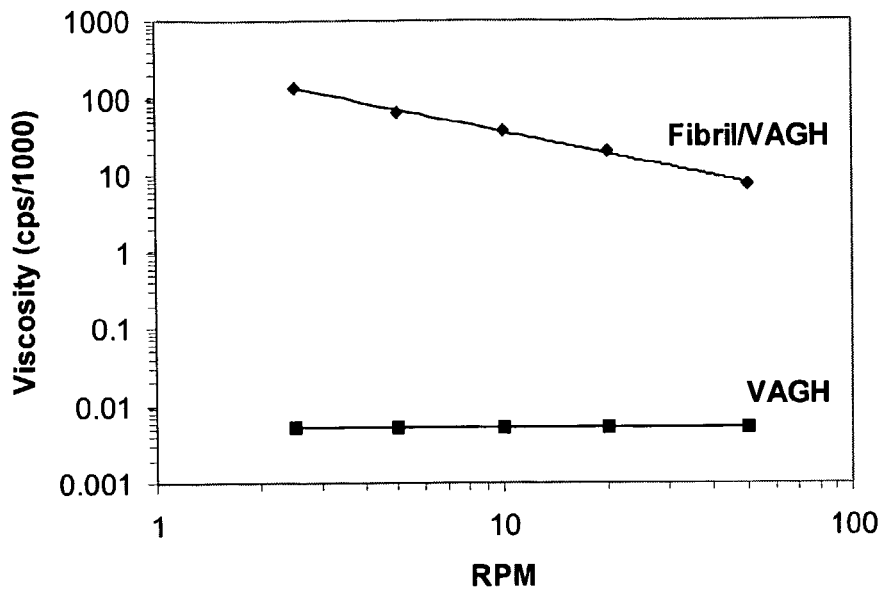
(a) Viscosity profile from VAGH binder alone and at the same level in fibril ink
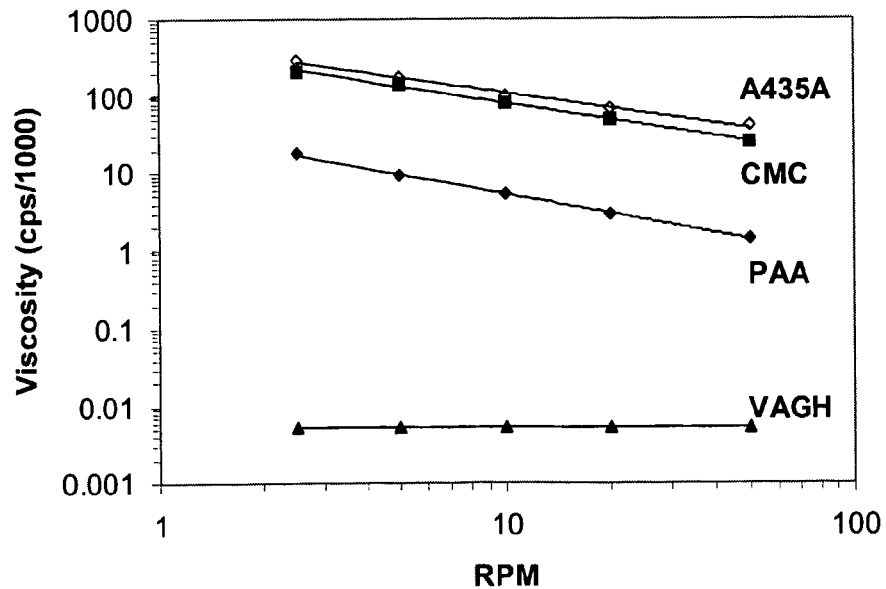
(b) Binder (3%, no fibrils) viscosity in comparison with Acheson A435A ink

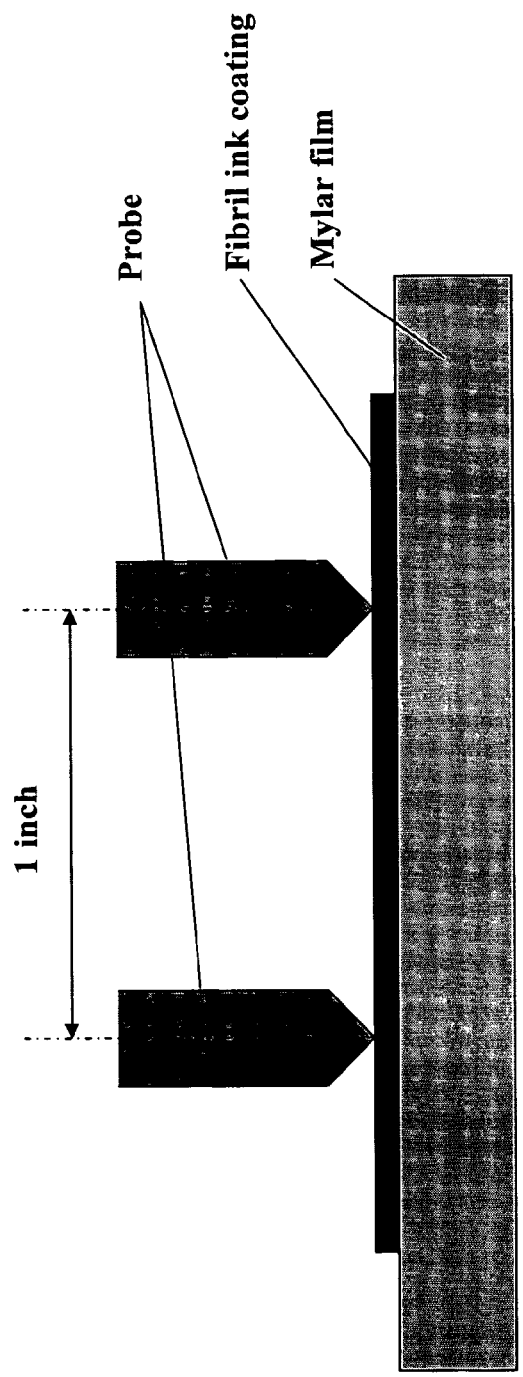
Figure 4  Two-point probe for measuring coating surface resistivity

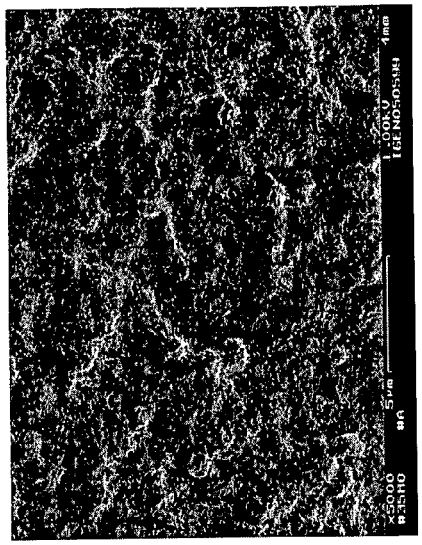
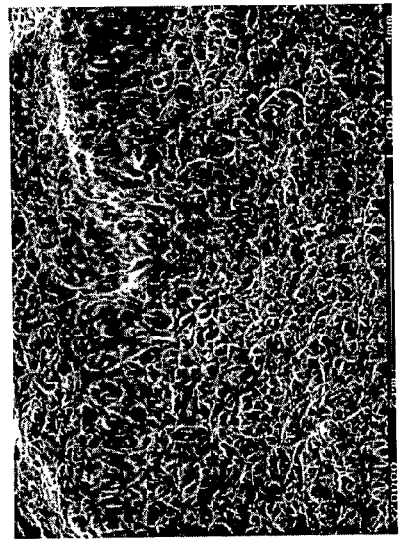
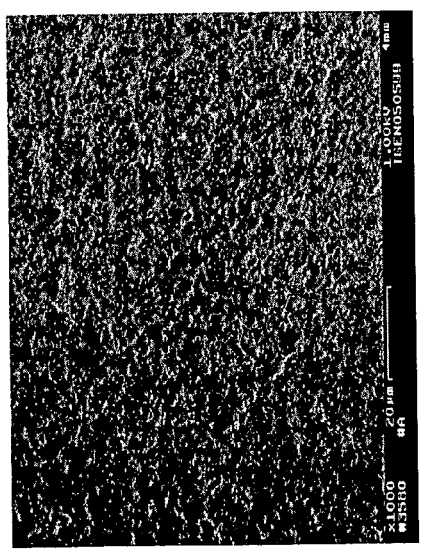
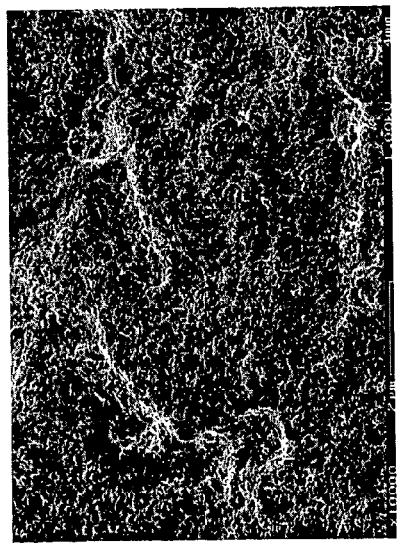
Figure 5  SEM images of 200-mesh screen-printed line made with fibril based ink (#1327-54-1).

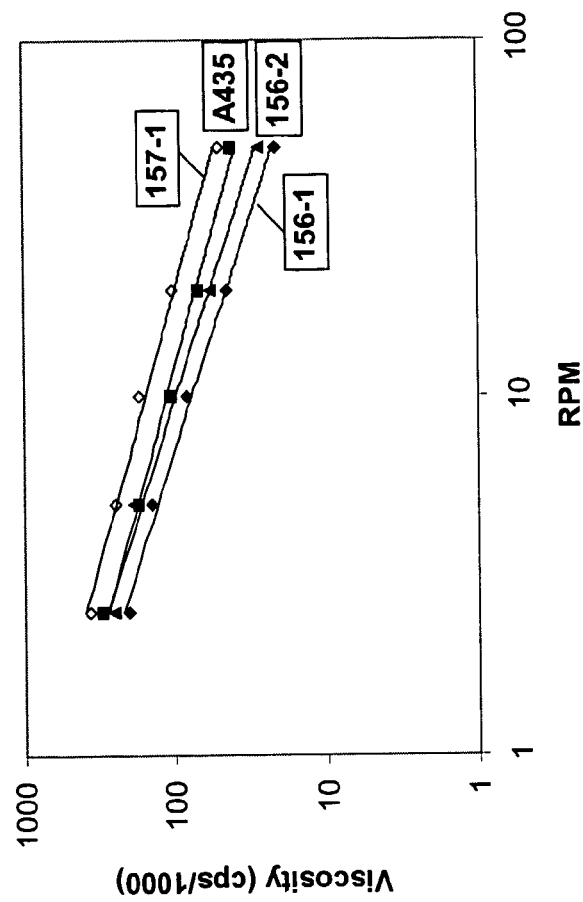
Figure 6  Viscosity profile of fibril inks with CAB binder versus commercially available carbon inks

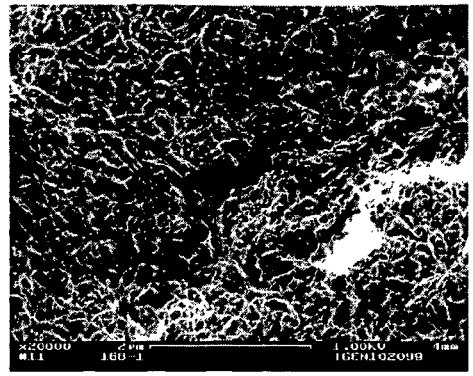
CC ink (sonicated)
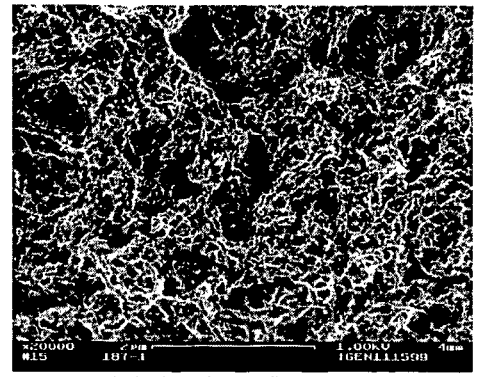
BN ink (sonicated)
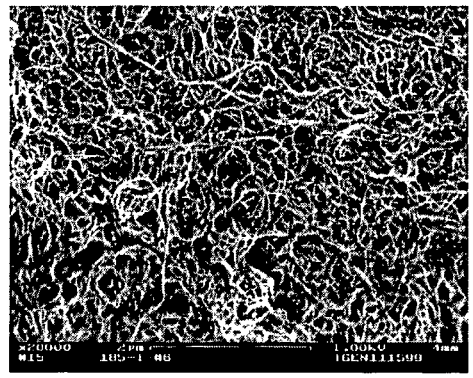
CC ink (roll-milled)
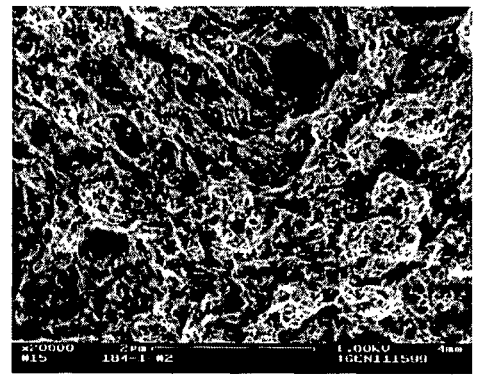
BN ink (roll-milled)
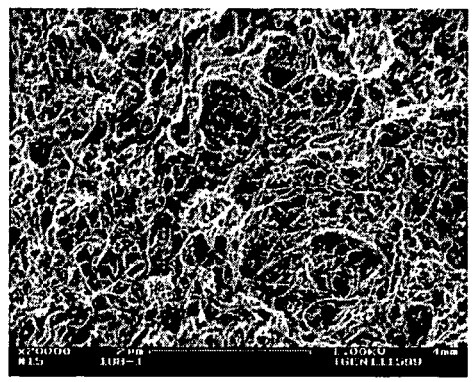
BN-CC (ox) ink
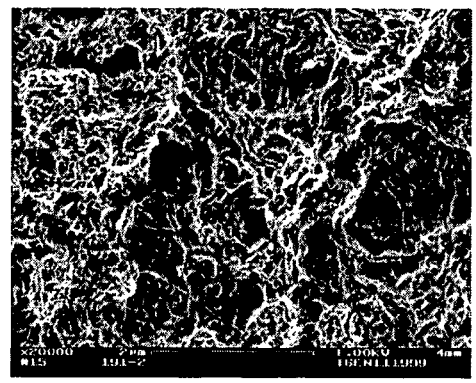
BN-CC ink
Figure 7  SEM images of fibril ink coating surface morphologies.

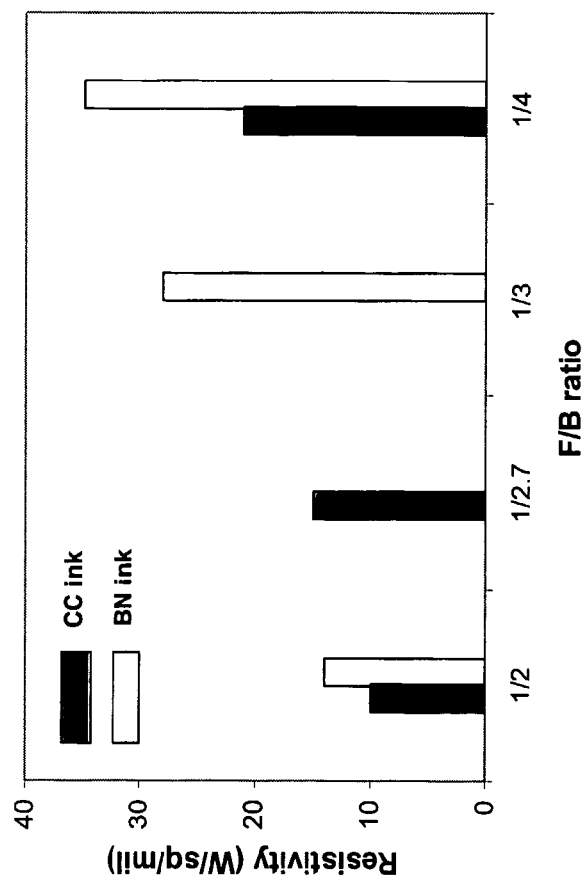
Figure 8 Coating resistivity as a function of Fibril/Binder ratio for BN and CC fibril ink.

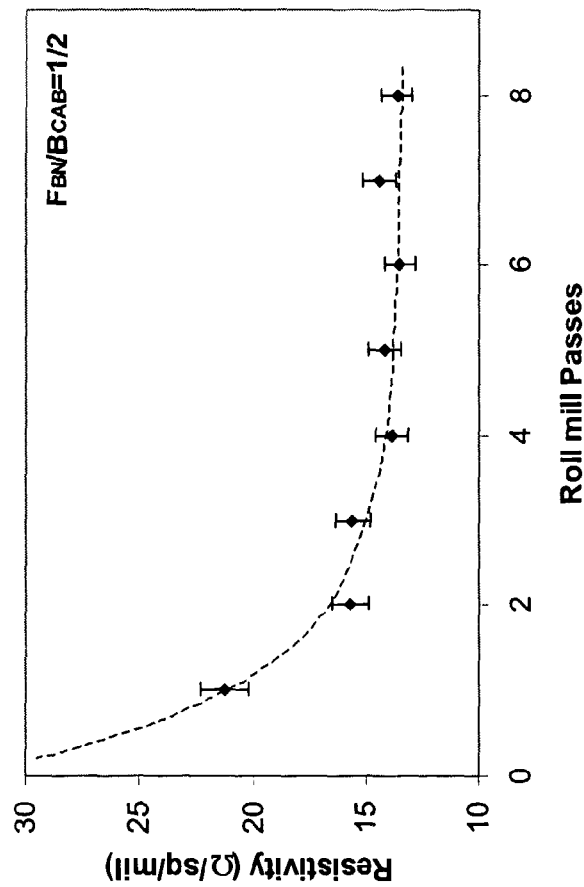
Figure 9    Change in BN ink resistivity with the increase of roll mill passes.

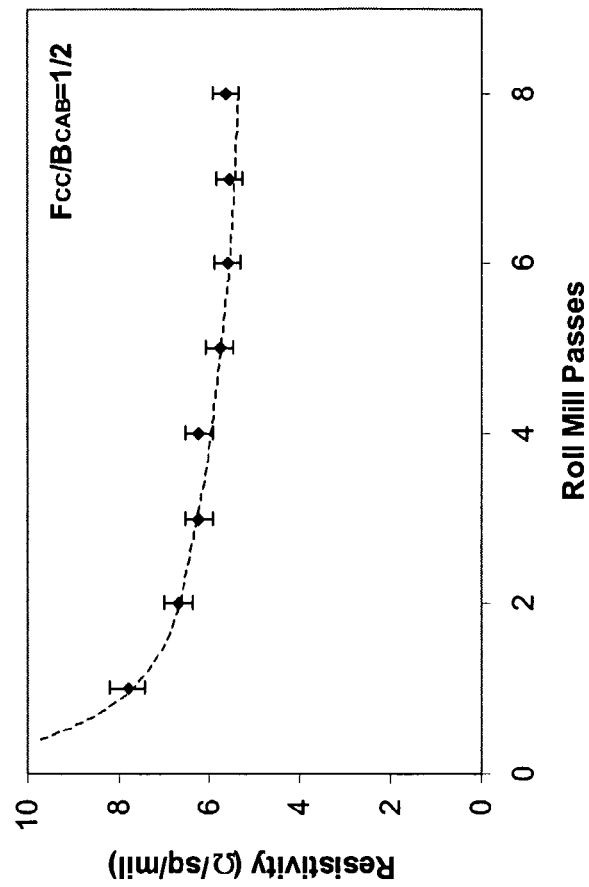
Figure 10 Change in CC ink resistivity with the increase of roll mill passes.

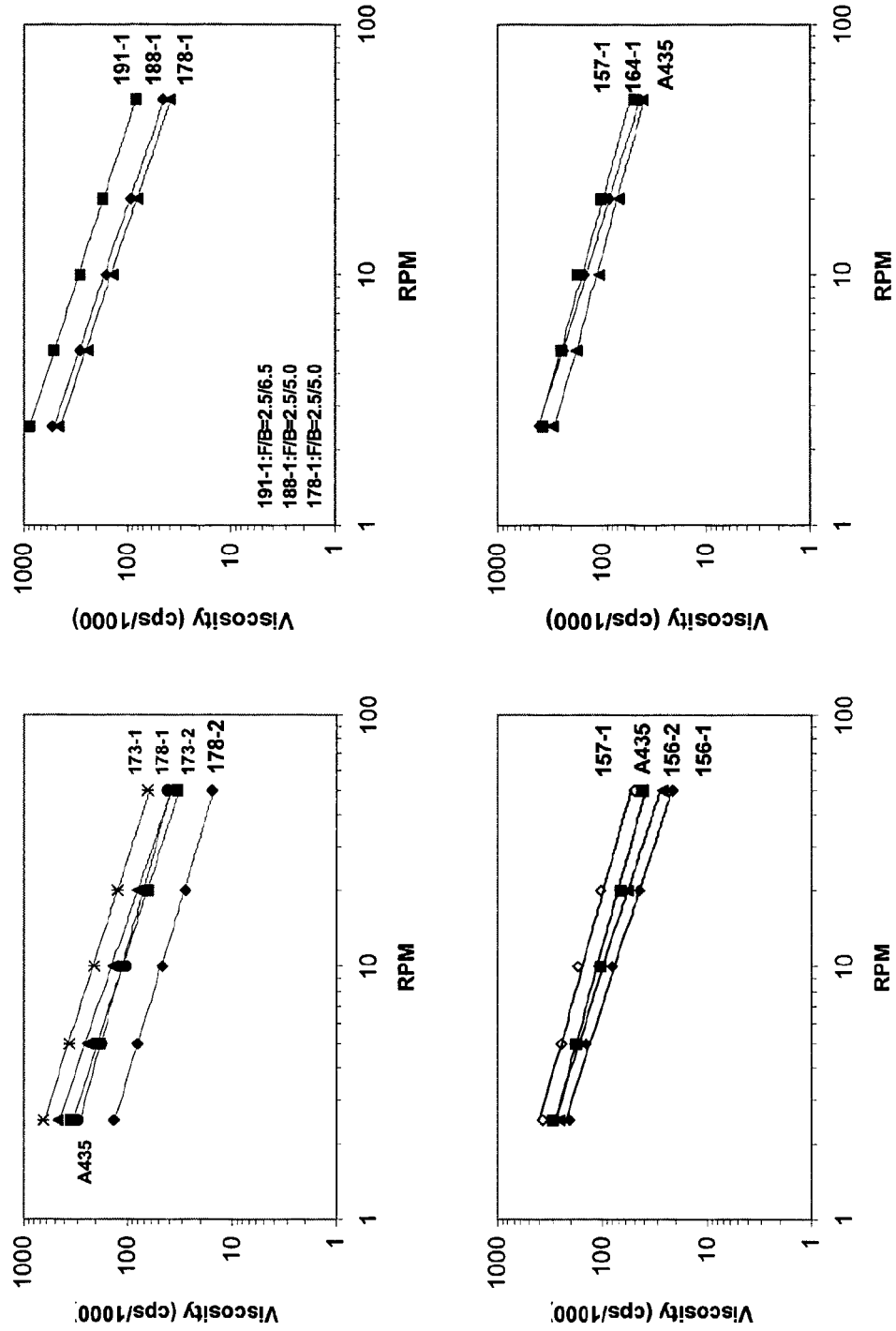
Figure 11 Viscosity profile of fibril inks with CAB binder vs commercially available carbon inks

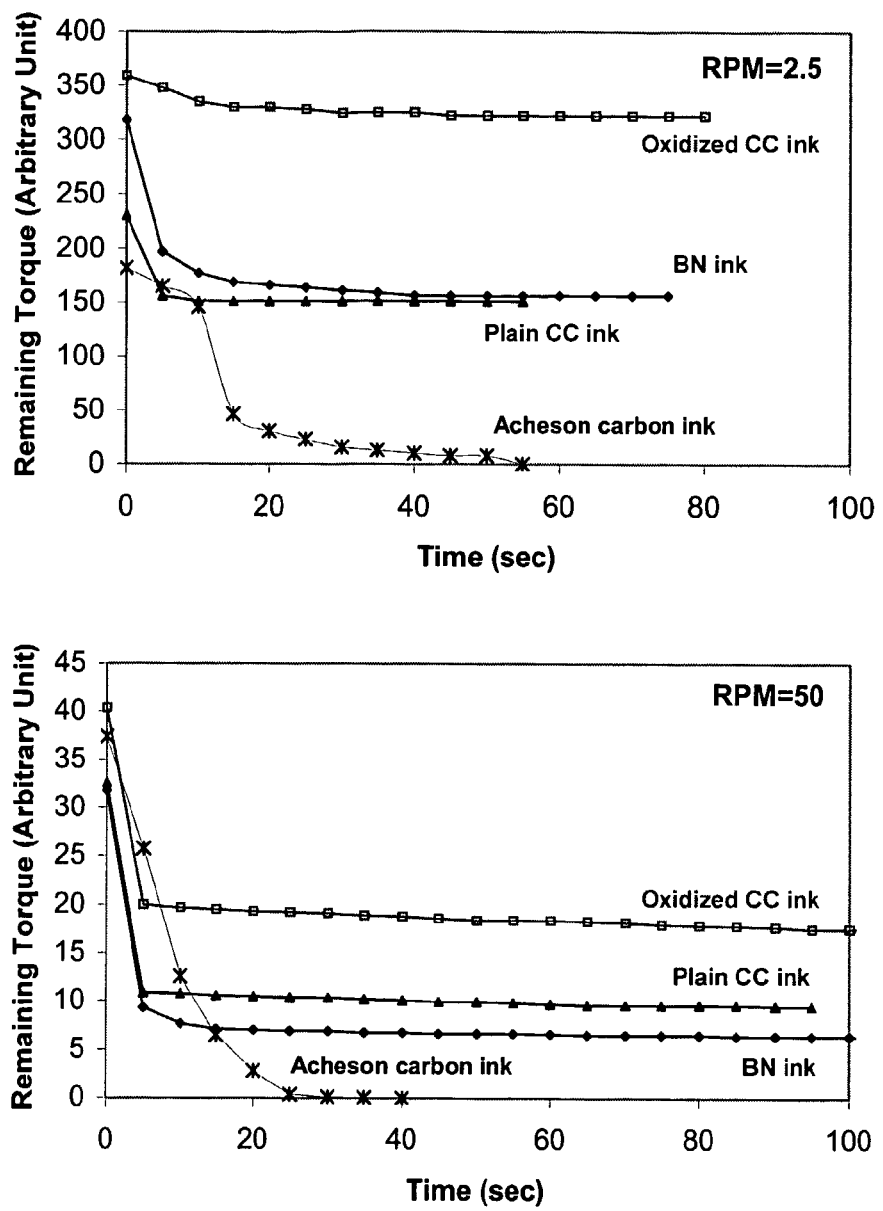
Figure 12 Changes in remaining torque after shutting down the spindle motor of Brookfield viscometer.

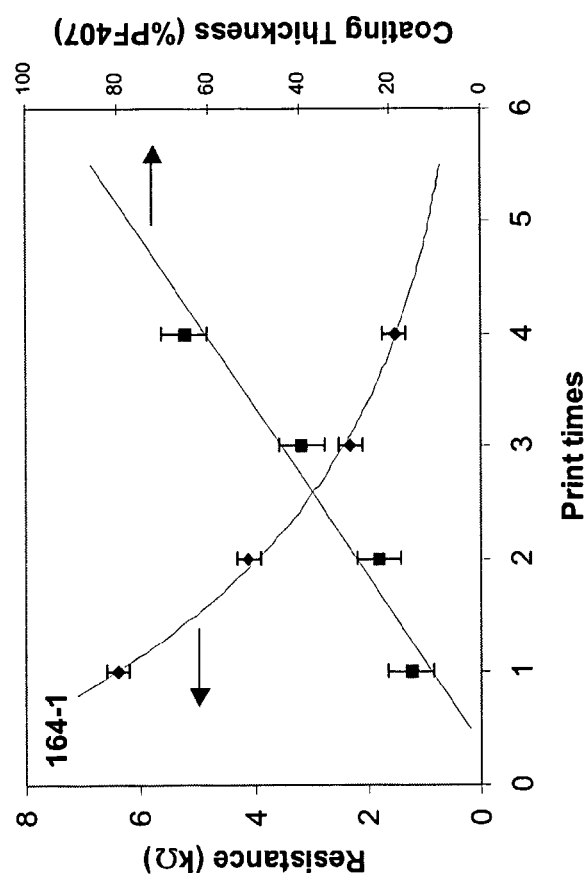
Figure 13 Relationship of screen printing passes and coating thickness for fibril ink.

ELECTROCONDUCTIVE CARBON FIBRIL-BASED INKS AND COATINGS

CROSS REFERENCE INFORMATION

This application is a continuation of U.S. application Ser. No. 10/517,748, filed Dec. 13, 2004, which issued as U.S. Pat. No. 8,083,970, which is a U.S. national stage of International Application No. PCT/US03/19068, filed Jun. 16, 2003, which claims priority to and benefit of U.S. Provisional Application No. 60/388,616, filed Jun. 14, 2002, all of which are hereby incorporated by reference in their entirety.

BACKGROUND OF THE INVENTION

1. Field of the Invention

The present invention broadly relates to electroconductive inks and electroconductive coatings containing carbon fibrils. More specifically, the present invention relates to screen printable inks or coatings that contain oxidized or nonoxidized carbon fibrils.

2. Background

Polymers which contain or have mixed therein an electrically conductive additive or filler are generally referred to in the art as electroconductive composites. These composites are often formed in an effort to obtain a compound combining desired attributes found in selected polymers (e.g., flexibility, durability, etc.) with those found in the selected fillers (e.g., conductivity, etc.)

One type of electroconductive composite is electroconductive coatings, which are thin electroconductive composites applied, directly or electrostatically, onto substrates such as automotive body parts. Known electroconductive coatings are comprised primarily of a polymeric binder which contain or have mixed therein a lesser amount of electroconductive filler such as finely divided particles of metal such as silver, gold, copper, nickel, palladium or platinum and/or carbonaceous materials like carbon black or graphite. The polymeric binder may attach the conductive filler to the substrate and/or hold the electroconductive filler in a conductive pattern which serves as a conductive circuit. In practice, the two key parameters for measuring an electroconductive coating are its conductivity and thickness. Thus, different amounts of polymeric binder and electroconductive filler are used to achieve different levels of conductivity and thickness.

In practice, a convenient method of creating an electroconductive coating is by using an electroconductive ink. In one embodiment, the electroconductive ink is an electroconductive coating in liquid form (i.e., where the polymeric binder is a liquid at room temperature and the electroconductive filler is dispersed therein). Such electroconductive inks are described in U.S. Pat. No. 5,098,771 to Friend entitled "Conductive Coatings And Inks," hereby incorporated by reference. Friend describes a composite suitable for application to a surface comprising polymeric binder and less than 30% carbon nanotubes, preferably less than 15% and even more preferably between 0.5 and 10 percent. (All percentages by weight based on nanotubes plus binder.) The coatings made by the conductive inks of Friend have bulk resistivity between 10 exp–2 and 10 exp 6 ohm cm, and preferably between 10 exp –1 and 10 exp 4 ohm cm. In another embodiment, the electroconductive ink contains three components: a polymeric binder, an electroconductive filler and a liquid vehicle. The liquid vehicle includes solvents (e.g., liquids which dissolve the solid components) as well as non-solvents (e.g., liquids which do not dissolve the solid components). The liquid vehicle serves as a carrier to help apply or deposit the polymeric binder and electroconductive filler onto certain substrates.

Once applied to a substrate, the electroconductive ink is dried (e.g., the solvent or liquid vehicle is vaporized or evaporated), and an electroconductive coating is formed from the remaining polymeric binder and electroconductive filler.

Unlike electroconductive coating, however, a key parameter for measuring electroconductive inks is viscosity. In particular, the viscosity of the electroconductive ink should be such that the ink will not "run" (i.e., spread horizontally in an undesirable fashion) or "bleed" (i.e., spread vertically in an undesirable fashion) when applied onto the substrate, otherwise the resulting electroconductive coating will not form with the proper or desired thickness, conductivity or at the proper location. Electroconductive inks which use a liquid vehicle are known to present various running and bleeding problems.

Furthermore, depending on the use of the electroconductive ink, thixotropy may also another important parameter for measuring electroconductive inks. Unlike viscosity, which measures the ability of the liquid to withstand shear force, thixotropy measures the ability of the liquid to change its viscosity in response to a shear force. Complicated applications may require electroconductive inks which are both viscous and thixotropic. Certain sophisticated applications such as screen printing further require that the thixotropy property be such that the viscosity of the ink will decrease in response to a shear force so that the ink can be forced through a screen. Thus, certain uses, such as screen printing will require an ink with a different set of rheological properties (i.e., viscosity, thixotropy) than others such as spray or ink jet applications where only viscosity may be important.

For this reason, current electroconductive coatings and electroconductive inks contain significantly greater amount of polymeric binders than electroconductive fillers. It was believed that the polymeric binder acted like a glue and thus was essential in electroconductive coatings to keep the electroconductive fillers in place or to attach them to the substrate, as well as in electroconductive inks to prevent the ink from running or bleeding. Thus, commercial carbon inks and coatings typically contain a greater weight percentage of polymeric binders than the electroconductive filler. The larger presence of polymeric binder, however, limits the overall conductivity of the electroconductive ink or coating.

The inventors have discovered, however, that the amount of polymeric binder needed in electroconductive coatings and inks can be eliminated or significantly reduced when using carbon fibrils of the present invention as an electroconductive filler. As a result, the inventors have also discovered that conductivity of the electroconductive coating or ink can be significantly improved.

OBJECTS OF THE INVENTION

It is an object of this invention to provide an electroconductive carbon fibril-based ink with improved conductivity.

It is a further and related object of this invention to provide an electroconductive carbon fibril-based ink with improved conductivity, but that incorporates less carbon material.

It is a related object of this invention to provide an electroconductive carbon fibril-based ink that has improved conductivity but that incorporates less polymeric binder.

It is yet another object of this invention to provide an electroconductive carbon fibril-based ink that incorporates less carbon material and less polymeric binder but has improved conductivity.

It is yet another object of this invention to provide an electroconductive carbon fibril-based ink that is easily applied to a rigid or flexible substrate.

It is yet another object of this invention to provide an electroconductive carbon fibril-based ink that is screen-printable.

It is still a further and related object of this invention to provide a method for creating an electroconductive carbon fibril-based ink.

It is a related object of this invention to provide an electroconductive carbon fibril based coating which contains little or no polymeric binder.

It is a further object of this invention to provide an electroconductive carbon-fibril based coating with enhanced conductivity.

It is a further object of this invention to provide a pattern of carbon fibrils on a field emission cathode.

It is a further object of this invention to provide printable active electronic components.

SUMMARY OF THE INVENTION

The present invention relates to coatings or inks containing carbon fibrils. There are two surprising advantages of using carbon fibril based coatings or inks. First, they provide a means to create superior electroconductive coatings. Second, they provide a convenient means to pattern carbon fibrils on a substrate when the properties of the fibrils (other than or in addition to conductivity, such as field emission or capacitance) are to be exploited.

Thus, the present invention relates to electroconductive inks that contain carbon fibrils. Preferably, the electroconductive ink comprises carbon fibrils and a liquid vehicle in which the ink has a viscosity ranging from 1, to 50,000 cps.

The carbon fibrils can be discrete fibrils, or can be in the form of aggregates of the cotton candy, open net, combed yarn, and/or bird nest type, or can be in the form of assemblages. Carbon fibrils can be in a non-oxidized or oxidized form or combinations thereof.

In another embodiment, the electroconductive inks of the present invention further comprises a polymeric binder. The polymeric binder may be present in an amount less than the found in known commercial carbon inks, as well as less than the amount of carbon fibrils.

These inks have rheological properties similar to that of commercial carbon inks, and thus can be applied by any known means to a substrate to form an electroconductive coating. The electroconductive coating is formed once the liquid vehicle of the electroconductive ink dries up. Depending on the composition of the electroconductive ink, the electroconductive coating will thus either comprise carbon fibrils, or carbon fibrils and the polymeric binder.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

BRIEF DESCRIPTION OF THE DRAWINGS

The accompanying drawings, which are incorporated in and constitute a part of the specification, illustrate an exemplary embodiment of the present invention.

FIG. 1 shows a graphical representation of the shear thinning index of the commercial 79-series of carbon fibril-based inks set forth in Table 1;

FIG. 2 shows a graphical representation of the comparison of the viscosity of samples of carbon fibril-based inks set forth in Table 1 versus that of commercially available carbon inks;

FIG. 3 is a graphical representation of showing the relative viscosity data for various binders such as CMC, PAA and VAGH;

FIG. 4 illustrates the configuration used to measure sheet resistivity with a probe;

FIG. 5 is a set of scanning electron images for the samples of Table 1;

FIG. 6 shows a graphical representation of the viscosity profile of fibril inks with CAB versus commercially available carbon inks;

FIG. 7 is a set of scanning electron images for the samples of Table 2;

FIG. 8 illustrates sheet resistivity as a function of fibril to binder ratio;

FIG. 9 shows how sheet resistivity changes as a function of the number of triple roll mill passes for BN fibrils;

FIG. 10 shows how sheet resistivity changes as a function of the number of triple roll mill passes for CC fibrils;

FIG. 11 shows the viscosity profiles for the samples of Table 2 versus commercially available carbon inks;

FIG. 12 shows the rheological profiles for the samples of Table 2 versus commercially available carbon inks; and FIG. 13 illustrates the screen-printing results using a 200 mesh screen for the samples of Table 2.

DETAILED DESCRIPTION OF THE INVENTION

Patents, patent applications, and patent publications referred to herein are incorporated by reference in their entirety.

Definitions

"Aggregate" refers to microscopic particulate structures of nanotubes (e.g., an entangled mass of fibrils), the mass typically having diameters greater than 1 μm and less than 5 mm.

"Assemblage" refers to nanotube structures having relatively or substantially uniform physical properties along at least one dimensional axis and desirably having relatively or substantially uniform physical properties in one or more planes within the assemblage, i.e. having isotropic physical properties in that plane. The assemblage can comprise uniformly dispersed individual interconnected nanotubes or a mass of connected aggregates of nanotubes. In other embodiments, the entire assemblage is relatively or substantially isotropic with respect to one or more of its physical properties. Assemblages can be engineered to have any convenient macroscopic dimensions.

"Carbon fibril-based ink" refers to an electroconductive composite in which the electroconductive filler is carbon fibrils.

"Coating" and "film" are used interchangeably to mean a thin layer.

"Graphenic" carbon is a form of carbon whose carbon atoms are each linked to three other carbon atoms in an essentially planar layer forming hexagonal fused rings. The layers are platelets having only a few rings in their diameter or ribbons having many rings in their length but only a few rings in their width.

"Graphenic analogue" refers to a structure which is incorporated in a graphenic surface.

"Graphitic" carbon consists of layers which are essentially parallel to one another and no more than 3.6 angstroms apart.

"Ink" is used interchangeably with "paint", to mean a colored liquid or other particulate containing liquid.

"Nanotube", "nanofiber" and "fibril" are used interchangeably. Each refers to an elongated hollow carbon structure having a diameter less than 1 µm. The term "nanotube" also includes "bucky tubes" and graphitic nanofibers in which the graphene planes are oriented in herring bone pattern.

Electroconductive Inks

Electroconductive inks of the present invention contain two essential components: carbon fibrils and a liquid vehicle. It is desirable that the electroconductive ink have the proper rheological properties (i.e., viscosity, thixotropy) needed for its application The desired viscosity ranges for electroconductive inks vary depending on the application:

| Ink Application | Viscosity Range |
|---|---|
| Jet Inks | |
| Aqueous Ink Jet | 1-3 cps at 20° C. |
| Continuous Ink Jet | 1-5 cps at 20° C. |
| UV Curing Ink | 10-15 cps at 50° C. or 50-100 cps at ambient temp |
| Hot Melt Ink Jet | 10-25 cps at 125° C. solid at ambient temp |
| Printing Inks at 25° C. | |
| Gravure | 30-200 cps |
| Flexographic | 50-500 cps |
| News ink | 200-1,000 cps |
| Screen printing | 1,000-50,000 cps |
| Letterpress | 1,000-50,000 cps |
| Lithographic | 10,000-80,000 cps |

As can be seen from the above, depending on the application method to be used, the desired viscosity may be from 1 to 50,000 cps or even higher. In addition, thixotropic index is a critical parameter and depends on application method.

Preferred thixotropic index values (or degree of thixotropy) are 1.0 to 10, and more preferably 1.0 to 1.5 based on the ratio of viscosity at one shear to the viscosity at a second shear. FIG. 1 illustrates several shear thinning index (n1) and degree of thixotropy (n2), which are also preferred since they are included in the 79-, 80- and A 435 (commercial inks). As seen from these values, the n1 and n2 values are 1.5 and 1.3. These values are based on the ASTM standard procedure for measuring the shear thinning index (n1) and degree of thixotropy (n2):

A) Set-up the Brookfield viscometer and record the temperature;
B) Calibrate the equipment with standard material;
C) Set the spindle rotate at the lowest speed and record the ink viscosity after ten revolutions (steady state);
D) Increase the spindle speed and record viscosity at each rpm;
E) Decrease the spindle speed from the higher rpm and record every viscosity; and
F) Stop the spindle motor, let the ink set, restart the spindle and record the viscosity at the lowest rpm.

The shear-thinning index is then obtained by dividing the apparent viscosity at a lower spindle speed by the viscosity at speed ten times higher, e.g. 2 and 20 rpm, 5 and 50 rpm. The higher ratio indicated better shear-thinning. The degree of thixotropy can be estimated by 1) calculating the ratio of the slowest speed viscosity taken with increasing speed to that with decreasing speed, or 2) calculating the ratio of the slowest speed viscosity taken after the rest period to that before the rest period. In both cases, the higher the ratio, the greater thixotropy. When the viscosity is presented as a function of RPM, the shear-thinning index can be easily observed by comparing different materials.

It has been discovered that since carbon fibrils can form very viscous solutions, a lower level of carbon fibrils may be used as compared to other electroconductive fillers such as carbon black to obtain an electroconductive ink having a viscosity and thixotropy within acceptable commercial limits.

Furthermore, it has been discovered, unlike prior electroconductive inks, that a polymeric binder is not necessarily required in the electroconductive ink of the present invention in order to attain the desired viscosity or thixotropy, or to subsequently form an adherent electroconductive coating of a desired thickness and/or conductivity.

Where a polymeric binder is used in the electroconductive ink of the present invention, whether to assist in obtaining a desired rheological property or for coating purposes, it has also been discovered that a lower amount of polymeric binder may be used as compared to other known electroconductive inks due to the unique properties of carbon fibrils It has been further discovered that electroconductive inks containing oxidized carbon fibrils require an even lower level (or none) of polymeric binder.

Once formed, the electroconductive ink may be sprayed, dipped, brushed, stenciled, transfer printed, slot-coated, spin-coated, or screen-printed onto a flexible or rigid substrate. Once applied to a substrate, the electroconductive ink can be used to make resistors, capacitors, electrodes, field emission cathodes, fuel cell catalysts, conductive coatings, conductive paper, conductive fabrics and conductive membranes.

The amount of carbon fibrils in the electroconductive ink can range from 0.1 to five percent by weight (0.1-5%), preferably one to five percent by weight (1-5%), more preferably 1.5 to 2.5 percent by weight (1.5-2.5%).

Where a polymeric binder is used with the electroconductive ink, the amount of polymeric binder can range from 0.1 to ten percent by weight (0.1-10%), preferably one to seven percent by weight (1-7%), more preferably two to five percent by weight (2-5%) or three to six percent by weight (3-6%) of the ink. It is generally preferred that there is a greater weight percentage of carbon fibrils than polymeric binder.

Other excipients such as surfactants, rheology modifiers, dispersing aids, stabilizers, curing aids or others may be present.

The remainder of the electroconductive ink is comprised of the liquid vehicle. Both aqueous and non-aqueous vehicles may be used Electroconductive Coatings An electroconductive coating is formed when an electroconductive ink dries (i.e., the liquid is evaporated or vaporized) on the substrate. Inasmuch as a lesser content of carbon fibrils or polymeric binders may be used to achieve the desired fluid characteristics compared to known electroconductive inks, the electroconductive coatings of the present invention thus may also contain a lesser amount of carbon material and/or polymeric binders than other electroconductive carbon coatings and still achieve the same conductivity.

If the electroconductive ink of the present invention only contains carbon fibrils and the liquid vehicle, then the electroconductive coating of the present invention is comprised of only the carbon fibrils since substantially all of the liquid vehicle is removed upon drying.

Thus, one preferred embodiment of the invention relates to an electroconductive coating or ink containing oxidized carbon fibrils and being substantially free of polymeric binder, preferably free of polymeric binder. Another embodiment relates to an electroconductive coating or ink consisting essentially of oxidized carbon fibrils and liquid vehicle.

On the other hand, if the electroconductive ink contains a polymeric binder, carbon fibrils, and the liquid vehicle, then the resulting electroconductive coating is comprised of polymeric binders and carbon fibrils. The amount of carbon fibrils in the electroconductive coating can range from nine to ninety-one percent by weight (9%-91%), preferably thirty to ninety percent by weight (30-90%), more preferably forty to eighty percent by weight (40-80%), more preferably fifty to seventy-five percent by weight (50-75%). The remainder of the coating is comprised of the polymeric binder.

Additionally, the weight ratio of carbon fibrils to polymeric binder in the electroconductive coating may be from 0.1 to 10. It is generally preferred that there is a greater weight percentage of carbon fibrils than polymeric binder. In cases where it is desired that the coating be non-porous a lower weight percentage of carbon fibrils to binder is preferred.

The electroconductive coatings of the present invention may have resistivity of 0.001 to 0.25 ohm-cm, preferably 0.05 to 0.09 ohm-cm. Furthermore, the electroconductive coating may have a thickness ranging from 2 microns to 20 microns, which may be achieved, for example by screen printing the electroconductive ink. For other methods, such as spray painting, an electroconductive coating having a thickness of one micron or less may be achieved. Other coating thicknesses such as 20 to 40 microns, for example by slot head coating, may also be achieved.

In addition to having significantly reduced amounts of carbon and/or polymeric binder, the electroconductive coating of the present invention can be used in more sophisticated applications than commercially known and available electroconductive coatings. For example, the electroconductive coating of the present invention may be used in field emission devices to emit electrons in a variety of applications including, but not limited to, microwave vacuum tube devices, power amplifiers, ion guns, high energy accelerators, free electron lasers, and electron microscopes, and flat panel displays. A description of the use of carbon fibrils based inks used in field emission devices or cathodes by screen printing or any other method is described in U.S. Provisional Application No. 60/298,193 filed Jun. 14, 2001 and entitled "Field Emission Devices Using Modified Carbon Nanotubes", to Takai et al., as well as pending U.S. application Ser. No. 10/171,760, filed Jun. 14, 2002, also entitled "Field Emission Devices Using Modified Carbon Nanotubes", to Takai et al, both of which are hereby incorporated by reference.

Takai, et. al. describe field emission from cathodes including emitters comprising carbon nanotubes which have been subjected to energy, plasma, chemical or mechanical treatment. Preferred treatments include laser, ion beam and plasma treatment.

Takai uses printed nanotube patterns 10-250 μm wide and up to 300 μm in height. Devices operate at pressures between $10^{-2}$ and $10^{-9}$ torr and operating voltages between 0.1 to 2.0 volts/μm.

Commercially available electroconductive inks which contain carbon black for example, cannot emit electrons and thus cannot be used in field emission devices.

Electroconductive Carbon Fibril Filler

The electroconductive filler used in the electroconductive inks or coatings of the present invention are carbon fibrils, also referred to interchangeably herein as nanotubes. The term "carbon fibrils" refers to carbon tubes having very small diameters including fibrils, whiskers, buckytubes, etc. and include discrete individual fibrils as well as aggregates or assemblages of fibrils or mixtures thereof. Such structures provide significant surface area because of their size and shape. Such nanotubes can be made with high purity and uniformity.

Preferably, the nanotubes used in the present invention have diameters less than 1 μm, preferably less than about 0.5 μm, even more preferably less than 0.1 μm, and most preferably less than 0.05 μm.

The nanotubes referred to herein are distinguishable from continuous carbon fibers commercially available as reinforcement materials. In contrast to carbon fibers, which have desirably large, but unavoidably finite aspect ratios, continuous carbon fibers have aspect ratios (L/D) of at least $10^4$ and often $10^6$ or more. The diameter of continuous fibers is also far larger than that of carbon fibrils, being always greater than 1 μm and typically 5 to 7 μm.

Carbon fibrils exist in a variety of forms and have been prepared through the catalytic decomposition of various carbon-containing gases at metal surfaces. U.S. Pat. No. 4,663,230 to Tennent hereby incorporated by reference, describes carbon fibrils that are free of a continuous thermal carbon overcoat and have multiple ordered graphitic outer layers that are substantially parallel to the nanotube axis. As such they can be characterized as having their c-axes, the axes which are perpendicular to the tangents of the curved layers of graphite, substantially perpendicular to their cylindrical axes. They generally have diameters no greater than 0.1 μm and length to diameter ratios of at least 5. Desirably they are substantially free of a continuous thermal carbon overcoat, i.e., pyrolytically deposited carbon resulting from thermal cracking of the gas feed used to prepare them. Tennent describes nanotubes typically 3.5 to 70 nm having an ordered, "as grown" graphitic surface.

U.S. Pat. No. 5,171,560 to Tennent et al., hereby incorporated by reference, describes carbon fibrils free of thermal overcoat and having graphitic layers substantially parallel to the nanotube axes such that the projection of the layers on the nanotube axes extends for a distance of at least two nanotube diameters. Typically, such nanotubes are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than 0.1 μm and a length to diameter ratio of greater than 5. These fibrils are of primary interest in the invention.

When the projection of the graphitic layers on the nanotube axis extends for a distance of less than two nanotube diameters, the carbon planes of the graphitic nanotube, in cross section, take on a herring bone appearance, these are termed fishbone fibrils. U.S. Pat. No. 4,855,091 to Geus, hereby incorporated by reference, provides a procedure for preparation of fishbone fibrils substantially free of a pyrolytic overcoat. These carbon fibrils are also useful in the practice of the invention. See also, U.S. Pat. No. 5,165,909 to Tennent, hereby incorporated by reference.

Thus the multiwall carbon nanotubes described above can be thought of as a continuum insofar as the orientation of the graphenic layers to the fiber axis is concerned.

Recently carbon nanotubes having a single wall comprising graphite have been produced. These single wall carbon nanotubes have been described in Bethune et al., U.S. Pat. No. 5,424,054; Guo, et al., Chem. Physics Lett., 243:1-12 (1995);

Thess, et al, Science, 273:483-487 (1996); Journet et al., Nature 388 (1997) 756; Vigolo, et al., Science 290 (2000) 1331. They are also described in U.S. patent application Ser. No. 08/687,665, entitled "Ropes of Single-Walled Carbon Nanotubes" herein incorporated by reference.

Individual single wall nanotubes have diameters between 0.4 and 3.5 nm, preferably 0.8 to 1.4 nm. Lengths can be several to 100 µm. Frequently single wall carbon nanotubes occur as "ropes", aggregates of more or less aligned tubes held together by Van Der Wals forces. Ropes may have diameters as large as several µm and lengths of several mm.

Methods of producing single wall nanotubes production have been described in PCT Application No. PCT/US99/25702 and PCT Application No. PCT US98/16071 herein incorporated by reference.

Single wall nanotubes are useful in a variety of applications. The tubular structure imparts superior strength, low weight, stability, flexibility, thermal conductivity, large surface area and a host of electronic properties. They can be used as reinforcements in fiber reinforced composite structures or hybrid composite structures, i.e., composites containing reinforcements such as continuous fibers in addition to single wall nanotubes.

Carbon fibrils which are oxidized are also useful in the present invention. Oxidized carbon fibrils contain functional groups attached to the surface which may permit the fibrils to otherwise bind together. For example, oxidized fibrils can be used to form porous assemblages. Thus, when oxidized fibrils are used in electroconductive inks or coatings, either no or a reduced amount of polymeric binder is needed to hold the coating together or to achieve the desired rheological property. Additionally, oxidized carbon fibrils disperse readily in water without the aid of surfactants. They are thus an important component of aqueous electroconductive inks.

U.S. Pat. No. 5,965,470 to Bening et al., hereby incorporated by reference, describes processes for oxidizing the surface of carbon fibrils that include contacting the nanotubes with an oxidizing agent that includes sulfuric acid ($H_2SO_4$) and potassium chlorate ($KClO_3$) under reaction conditions (e.g., time, temperature, and pressure) sufficient to oxidize the surface of the fibril. The nanotubes oxidized according to the processes of McCarthy, et al. are non-uniformly oxidized, that is, the carbon atoms are substituted with a mixture of carboxyl, aldehyde, ketone, phenolic and other carbonyl groups.

In published work, McCarthy and Bening (Polymer Preprints ACS Div. of Polymer Chem. 30 (1)-420 (1990)), incorporated by reference, prepared derivatives of oxidized nanotubes in order to demonstrate that the surface comprised a variety of oxidized groups. The compounds they prepared, phenylhydrazones, haloaromaticesters, thallous salts, etc., were selected because of their analytical utility, being, for example, brightly colored, or exhibiting some other strong and easily identified and differentiated signal.

Nanotubes can be oxidized using hydrogen peroxide, chlorate, nitric acid and other suitable reagents. See, for example, U.S. patent application Ser. No. 09/861,370 filed May 18, 2001 entitled "Modification of Carbon fibrils by Oxidation with Peroxygen Compounds."

U.S. patent application Ser. No. 09/358,745, filed Jul. 21, 1999, entitled "Methods of Oxidizing Multiwalled Carbon fibrils", hereby incorporated by reference, describes gas phase oxidizing agents, including $O_2$, $O_3$, $N_2O$, $CO_2$, and steam. Reaction temperatures are 200° to 900° C. with a partial pressure of oxidizing agent between 1 and 7600 torr. A reaction time of 0.1 to 24 hours is needed.

Nanotubes have also been oxidized non-uniformly by treatment with nitric acid. International Application WO95/07316, hereby incorporated by reference, discloses the formation of oxidized fibrils containing a mixture of functional groups, for the purpose of improving adhesion between the nanotubes and polymer.

International Application WO96/18059, hereby incorporated by reference, describes many methods for nanotube functionalization, including sulfonation, electrophilic addition to deoxygenated fibril surfaces and metallization. Sulfonation is accomplished by reaction with fuming sulfuric acid in the liquid phase at temperatures around 80° C. or by reaction with $SO_3$ in inert aprotic solvents or in gas phase.

Electrophilic addition first deoxygenates fibril surfaces in vacuum or in inert gas at ca. 1000° C. This can be followed by room temperature gas phase reaction with acrylic acid or its esters, maleic anhydride, cyanogens, acryloyl chloride or other terminally unsaturated compounds.

Metallization relies on the reaction of fibrils with organometallic reagents, typically organolithium compounds in an aprotic solvent, optionally in the presence of a strong base such as potassium t-butoxide. Trialkyl aluminum and thallium triflate may also be used.

International Application WO96/18059 also teaches functionalization of fibril surfaces by adsorption of porphyrins and or phthalocyanines.

Carbon fibrils of a morphology similar to the catalytically grown fibrils or nanotubes described above have been grown in a high temperature carbon arc (Iijima, Nature 354 56 1991, hereby incorporated by reference). It is now generally accepted (Weaver, Science 265 1994, hereby incorporated by reference) that these arc-grown nanofibers have the same morphology as the earlier catalytically grown fibrils of Tennent. Arc grown carbon nanofibers are also useful in the invention.

As with all nanoparticles, nanotubes aggregate in several stages or degrees. Catalytically grown nanotubes produced according to U.S. Pat. No. 6,031,711 are formed in aggregates substantially all of which will pass through a 700 µm sieve. About 50% by weight of the aggregates pass through a 300 µm sieve. The size of as-made aggregates can be reduced by various means.

These aggregates have various morphologies (as determined by scanning electron microscopy) in which they are randomly entangled with each other to form entangled balls of nanotubes resembling bird nests ("BN"); or as aggregates consisting of bundles of straight to slightly bent or kinked carbon fibrils having substantially the same relative orientation, and having the appearance of combed yarn ("CY")— e.g., the longitudinal axis of each nanotube (despite individual bends or kinks) extends in the same direction as that of the surrounding nanotubes in the bundles; or, as, aggregates consisting of straight to slightly bent or kinked nanotubes which are loosely entangled with each other to form an "open net" ("ON") structure or "cotton candy" ("CC") resembles a sindle or rod of entangled fibers with a diameter that may range from 5 nm to 20µ with a length that may range from 0.1 µm to 1000 µm. In open net structures the extent of nanotube entanglement is greater than observed in the combed yarn aggregates (in which the individual nanotubes have substantially the same relative orientation) but less than that of bird nest. CY and ON aggregates are more readily dispersed than BN. See U.S. Pat. No. 5,110,693, hereby incorporated by reference.

When carbon fibrils are used, the aggregates, when present, are generally of the bird's nest, cotton candy, combed yarn or open net morphologies. The more "entangled" the aggregates are, the more processing will be required to achieve a suitable composition if a high porosity is desired. This means that the selection of combed yarn or open net aggregates is most preferable for the majority of applications. However, bird's nest aggregates will generally suffice.

The morphology of the aggregate is controlled by the choice of catalyst support. Spherical supports grow nanotubes in all directions leading to the formation of bird nest aggregates. Combed yarn and open nest aggregates are prepared using supports having one or more readily cleavable planar surfaces, especially alumina and magnesia. U.S. Pat. No. 6,143,689 hereby incorporated by reference, describes nanotubes prepared as aggregates having various morphologies.

Further details regarding the formation of carbon fibril or nanofiber aggregates can be found in the disclosures of U.S. Pat. Nos. 5,165,909; 5,456,897; 5,707,916; 5,877,110; PCT Application No. US89/00322, filed Jan. 28, 1989 ("Carbon Fibrils") WO 89/07163, and Moy et al., U.S. Pat. No. 5,110, 693, U.S. patent application Ser. No. 447,501 filed May 23, 1995; U.S. patent application Ser. No. 456,659 filed Jun. 2, 1995; PCT Application No. US90/05498, filed Sep. 27, 1990 ("Fibril Aggregates and Method of Making Same") WO 91/05089, and U.S. Pat. No. 5,500,200; U.S. application Ser. No. 08/329,774 by Bening et al., filed Oct. 27, 1984; and U.S. Pat. No. 5,569,635, all of which are assigned to the same assignee as the invention here and of which are hereby incorporated by reference.

Nanotube mats or assemblages have been prepared by dispersing nanofibers in aqueous or organic media and then filtering the nanofibers to form a mat or assemblage. The mats have also been prepared by forming a gel or paste of nanotubes in a fluid, e.g. an organic solvent such as propane and then heating the gel or paste to a temperature above the critical temperature of the medium, removing the supercritical fluid and finally removing the resultant porous mat or plug from the vessel in which the process has been carried out. See, U.S. Pat. No. 5,691,054, hereby incorporated by reference.

Liquid Vehicle

The liquid vehicle serves as the carrier for the carbon fibrils. Liquid vehicles may be a solvent or a nonsolvent, depending on whether or not they dissolve solids which are mixed therein. The volatility of the liquid vehicle should not be so high that it vaporizes readily at relatively low temperatures and pressures such as room temperature and pressure, i.e., 25° C. and 1 atm. The volatility, however, should not be so low that the solvent does not vaporize when the ink is dried at mild oven conditions, for example 1 hour at 200 degrees centigrade for an electroconductive coating of 1 mil final thickness.

In one embodiment, the liquid vehicle is used to solubilize the polymeric binder and the carbon fibril in order to render the composition easily applied to a substrate.

Examples of liquid vehicles include, but are not limited to, nonhydrocarbon polar organic solvents such as carbitol, carbitol acetate, butyl carbitol, butyl carbitol acetate, butyrolactone, acetone, methyl ethyl ketone, cyclohexanone, dibasic ester solvent, diglyme, and high boiling alcohols and alcohol esters. Various combinations of these and other vehicles can be used to obtain the desired volatility requirements for each application. For example, for screen-printing applications, the liquid vehicle chosen should have a boiling point from about 150° C. to 240° C.

In some cases, water can also be used as solvent to dissolve polymers and form liquid vehicles. When combined with specific polymers, (See U.S. Pat. No. 4,427,820 to Backhouse), these aqueous systems can replace solvent based inks while maintaining designated thixotropic properties.

Polymeric Binder

Where desired, the polymeric binder suitable for the present invention can be thermoset or thermoplastic resins, or a mixture thereof. It is preferred that the polymer binder be pyrolyzable.

Examples of thermoplastic resins include, but are not limited to, polyethylene, polypropylene, polyamide, polyurethane, polyvinyl chloride, or thermoplastic polyester resin. Examples of thermoset resins include, but are not limited to, thermoset polyester resin or epoxy resin.

Furthermore, the binder used can be homopolymers or multipolymers. For example, multipolymers include those that result from the copolymerization of vinyl acetate, vinyl chloride, and ethylenically unsaturated dicarboxylic acids. Examples of polymerizable ethylenically unsaturated acids include, but are not limited to itaconic acid, fumaric acid and maleic acid.

Examples of water soluble polymers in water-based systems include, but are not limited to, polyacrylic acid, polymaleic acid, and polyacrylamide, polyvinyl alcohol, hydroxyethyl cellulose, carboxymethyl cellulose, and acrylic-based polymers. Pp aid and surfactant XP 99.001 an acrylic co-polymer made by Emerging Technologies Inc. of Greensboro N.C.

The choice of the proper binder for the ink may be dependent on the substrate that is ultimately used. For example, the binder should be chemically compatible with the substrate and have the proper viscosity and/or thixotropy such that the binder can be easily applied to the substrate.

Excipients

Other excipients can be added to enhance the physical and chemical properties of the electroconductive ink and/or coating. For example, a surfactant can be added to make the ink more physically stable and to prevent any phase separation of the polymeric binder from the carbon fibrils. Examples of surfactants include, but are not limited to, polyoxypropylene-polyoxyethylene block copolymer (PLURONIC from BASF of Mount Olive, N.J.) and polyoxyethylene(10) isooctylphenyl ether (TRITON from Dow of Midland, Mich.

Particularly preferred is surfynol CT324 dispersing aid. Surfactant quantities are usually 0.1 to 0.2% in the ink.

Thickeners and flow agents can be added to further change the rheological properties of the ink. A second conductive filler, such as a metal flake or carbon black, can be used to further enhance electroconductivity. Other excipients include, but are not limited to, rubbers, other resins, chelators and acids.

Conductive Salts

The electroconductive ink or coating of the present invention may also contain conductive salts such as lithium compounds like lithium hexafluorophospahte. One example of using a conductive salt with the electroconductive ink or coating of the present invention would be to make an electrolyte solution for printable supercapacitors.

In one embodiment, the supercapacitor comprises carbon nanotubes, conductive salts, polymer and a liquid vehicle. In a more specific embodiment, the supercapacitor comprises oxidized carbon nanotubes, conductive salts such as lithium hexafluorophosphate, polymers such as PEO or PC and a MeOH liquid vehicle. Other organic vehicles may be used.

Ink Formulation

To form an electroconductive ink of the present invention containing a polymeric binder, carbon fibrils and liquid vehicle, a solution is first formed by blending the polymeric binder with the liquid vehicle until the binder is uniformly dispersed in the vehicle. Any conventional means of mixing or agitation known in the art can be used (e.g., blender, mixer, stir bar, etc.).

Carbon fibrils of the desired concentration are then added and/or mixed with the solution. The carbon fibrils can optionally be added via another liquid carrier. On the other hand, if no polymeric binder is used to form the electroconductive ink, then carbon fibrils can be added initially to the liquid vehicle and mixed therein.

Preferably, the carbon fibrils are dispersed uniformly in the solution using any dispersion means known in the art. Such uniform dispersion can be accomplished by the use of a sonicator. For example, a probe sonicator (available from Branson Ultrasonics Corporation of Danbury, Conn.) can be used at a high enough power setting to ensure uniform dispersion (e.g., 450 Watts can be used). Sonication may continue until a gel-like slurry of uniformly dispersed fibrils is obtained. The sonication can be performed (i) in a mixture with the liquid vehicle with, or without, the polymer binder or (ii) at a dilute level in the liquid vehicle with subsequent concentration and drying. Dispersion is not very effective at carbon fibril concentrations ranging from about 0.2% to 0.5% because their high viscosity prevents convection and mixing. Lower concentrations of fibrils result in greater dispersion.

After dispersion, the entire mixture may be milled to further incorporate and disperse the carbon fibrils. The milling also generates shear forces that make the carbon fibril particles more uniform and smaller resulting in increased homogeneity. The milling process can be repeated until the desired consistency is obtained. A three-roll mill or other conventional milling machine can be used.

Finally, the ink formulation is filtered using, for example, a pressurized filtration device. Metal screens with varying mesh sizes can be used as the filter. The appropriate mesh size is dependent upon the requirements needed for the application process. For example, a 500 mesh filter size can be used to create an ink that is suitable for screen-printing. Filtration may cause the dispersed material to become more concentrated. Redispersion is effected by the milling process.

Ink Properties

Currently available on the market are commercial inks that have carbon black as their conductive filler. Examples of these commercial inks are Acheson 435A and Acheson 467A both available from Acheson Colloids Company (Port Huron, Mich.).

These two Achesons inks were used for comparison with the carbon fibril-based inks of the present invention. In order to identify carbon fibril-based ink formulations that had similar rheological properties to commercial carbon black inks, various formulations were created that varied in the following parameters: type of carbon fibril aggregate, type of binder, type of solvent, concentration of carbon fibrils, ratio of carbon fibril to binder, combination of plain carbon fibrils (unoxidized carbon fibrils) with oxidized carbon fibrils and combinations of carbon fibrils with carbon black. Table 1 sets forth a first series of ink formulations and their physical properties.

TABLE 1

| Sample ID | Carbon Fibril (%) | Binder (%) | Surfactant (%) | Solvent | Sheet Resistivity ($\Omega$/sq/mil) | Coating Appearance | Viscosity Profile |
|---|---|---|---|---|---|---|---|
| 18-1 | 1 | $1^A$ | $0.5^I$ | butyrolactone | 9 | poor | |
| 18-2 | 1 | $2^A$ | $0.5^I$ | butyrolactone | 15 | fair | |
| 18-3 | 1 | $4^A$ | $0.5^I$ | butyrolactone | 22 | good | |
| 18-4 | 1.2 | $3.1^B$ | $0.5^I$ | butyrolactone | 20 | very good | 3 |
| 54-1 | 1.5 | $4.2^B$ | $0.5^I$ | butyrolactone | 24 | good | |
| 58-1 | 1.9 | $4.9^B$ | $0.5^{II}$ | NMP | 25 | excellent | 3 |
| 59-1 | 2.8 | $7.6^B$ | $0.5^{II}$ | NMP | 26 | good | 3 |
| 66-2 | 1.4 | $2.8^A$ | $0.5^{II}$ | NMP | 10 | good | |
| 73-1 | 1 | $2.7^A$ | $0.6^{II}$ | NMP | 16 | good | |
| 74-1 | 2 | $4^B$ | $0.5^I$ | NMP | 16 | good | |
| 79-1 | 1.5 | $3^A$ | $0.5^I$ | butyrolactone | 10 | good | 3 |
| 79-2 | 1.5 | $3^B$ | $0.5^{II}$ | butyrolactone | 10 | good | 3 |
| 80-1 | 1.5 | $3^A$ | $0.5^{II}$ | NMP | 14 | fair | 3 |
| 80-2 | 1.5 | $3^B$ | $0.2^I$ | NMP | 13 | fair | 3 |
| 84-0 | 1.5(4/0) | $3^B$ | $0.2^I$ | PMA | 11 | good | |
| 84-1 | 1.5(3/1) | $3^B$ | $0.2^I$ | PMA | 11 | good | |
| 84-2 | 1.5(1/1) | $3^B$ | $0.2^I$ | PMA | 10 | good | |
| 84-3 | 1.5(1/3) | $3^B$ | $0.2^I$ | PMA | 28 | very good | |
| 84-4 | 1.5(04) | $3^B$ | $0.2^I$ | PMA | 33 | very good | |
| 93-1 | 1.5 | $3^C$ | $0.2^I$ | MEK | 12 | poor | |

$^A$VAGF
$^B$VAGH
$^C$vinyl butyral
$^I$octoxynol-9 (Triton X-100)
$^{II}$Tallow diamine dioleic acid salt (Duomeen TDO)
*cc/oxidized cc The samples set forth in Table 1 were evaluated for their various properties such as viscosity, coating quality, sheet resistivity, conductivity, screen-printability and morphology.

For screen printing purposes, the inks need to meet specific rheological characteristics. For example, the viscosity should be between 1,000 to 50,000 cps. Viscosity impacts how easy it is to spread the ink in an even layer on top of a screen during screen printing. If the inks have too low a viscosity, then the inks will bleed through the screen. During the actual screen printing process, the viscosity however, needs to be low enough to allow flow. And thus, it is desirable for the ink to be thixotropic (i.e., viscosity decreases when the ink is agitated or subjected to a shear force) to force the ink through the screen. Once applied to the substrate, the viscosity needs to increase again in order to adhere to the substrate and to obtain a clear separation when the screen is removed.

To measure the viscosity and thixotropy of the inks, a Brookfield rotational viscometer, for example using spindle 64, can be used. The ink should be kept in a water bath at about 25° C. for an hour before measuring. To determine thixotropy, the viscosity is measured at different shear rates, which is a function of the rotational speed of the spindle. By factoring in viscosity recovery rates, a shear thinning index can be produced to measure thixotropy.

FIG. 1 shows the shear thinning index measurements for the 79 and 80 carbon fibril-based inks series set forth in Table 1. The shear thinning index measurements are plotted against the shear thinning index measurement for the commercial ink Acheson A435. As shown in FIG. 1, the sample inks have comparable shear thinning indices to the Acheson A435, however, they are not easily screen-printed. FIG. 2 shows a comparison of the viscosity of samples 59-1, 58-1, and 18-4 versus commercially available carbon-based inks, i.e., Acheson 435A and Acheson PF407A. As shown in FIG. 2a, both samples 58-1 and 18-4 have lower viscosities than either Acheson sample. In contrast, sample 59-1 has a higher viscosity than both Acheson samples. Thus, it is shown by that by adjusting carbon fibril concentration, any desired viscosity can be achieved. FIG. 2b shows viscosity as a function of solids content. As shown, as the solids content increases, the viscosity increases.

From FIGS. 1 and 2, it can be seen that the rheological properties of the samples set forth in Table 1 need to be improved. One way to improve the carbon fibril-based inks is to identify binders that have greater viscosity.

ing an electroconductive ink are paper and fabric. The gap setting can be chosen from 1 mil to about 8 mil. The inks were first dried in a convection oven at a temperature of 60° C. to 80° C. The coatings were evaluated for uniformity, i.e., the presence of any lumps or voids in sheet resistivity. Multiple coatings can be used to increase the desired thickness and reduce the number of pinholes or other defects.

To measure sheet resistivity a probe having ⅝" brass edge probes spaced ⅝" apart was used. Two separate points of resistance were measured on MYLAR. The sheet resistivity was then normalized to 1 mil of thickness. Data for the sheet resistivity is shown in Table 1. From this data, it is shown that with fibril levels of 30% or higher have resistivities comparable to the most conductive commercial inks. FIG. 4 shows the configuration of the probes relative to the substrate.

Fibrils are not a very efficient space filling material. A mat with a density of 0.3 cm$^3$ has an 85% void volume. In order to fill the void space, certain samples had carbon black blended into the void space instead of additional polymeric binder. These formulations did not yield significant advantages or increases in performance over formulations with fibrils alone.

In addition to the testing, castings made from the samples were evaluated by reviewing scanning electron microscopy images. The images showed that coatings made with the fibril based inks showed morphology quite similar to that observed in fibril mats or in the fibril/polymer composites. FIG. 5 shows SEM images of a section of a test pattern made with a fibril based ink. The distribution of fibrils is typical for dispersed CC.

From the initial testing of the samples set forth in Table 1, none of the samples had rheological properties that were close enough to commercial carbon ink. Accordingly, a new binder was identified, and a new series of samples were evaluated.

For the second series of samples, cellulose acetate butyrate ("CAB") (Aldrich, Inc.) was used as the polymeric binder. Table 2 summarizes this second series.

TABLE 2

| Example | Sample ID | Fibril (%) | Binder (%) | Surfactant (%) | Solvent | Sheet Resistivity | Coating Appearance | Screen Print | Filter (mesh) | Comment |
|---|---|---|---|---|---|---|---|---|---|---|
| 1 | 156-1 | 1.5 | 4 | 0.2$^I$ | Butyrolactone | 18 | Very good | 3 | 325 | Predispersed CC |
| 2 | 156-2 | 1.8(1/1) | 3.6 | 0.2$^I$ | Butyrolactone | 16 | Very good | 3 | 325 | Plain CG/CC(ox) |
| 3 | 157-1 | 1.6 | 4.3 | 0.2$^I$ | Butyrolactone | 18 | Very good | 3 | 325 | Plain CC |
| 4 | 164-1 | 2 | 4 | 0.2$^I$ | Butyrolactone | 29 | Very good | 3 | 325 | Oxidized CC |
| 5 | 168-1 | 1.2 | 2.5 | — | Butyrolactone | 10 | Very good | | 325 | Plain CC |
| 6 | 173-1 | 2.5 | 7.5 | 0.3$^{II}$ | Butyrolactone | 28 | Good | | 500 | BN |
| 7 | 173-2 | 1.8 | 5.5 | 0.2$^{II}$ | Butyrolactone | 28 | Good | 3 | 500 | BN |
| 8 | 176-1 | 3.5 | 7.0 | — | Butyrolactone | 14 | Good | 3 | 500 | BN, roll mill only |
| 9 | 176-2 | 2.5 | 5.0 | — | Butyrolactone | 14 | Good | | 500 | BN, roll mill only |
| 10 | 178-1 | 2.5 | 5.0 | 0.2$^{II}$ | Butyrolactone | 18 | Good | 3 | 500 | BN |
| 11 | 178-2 | 1.5 | 6.0 | 0.2$^{II}$ | Butyrolactone | 36 | Good | 3 | 500 | BN |
| 12 | 184-1 | 3.5 | 7.0 | — | Butyrolactone | 14 | Good | | 500 | BN, roll mill only |
| 13 | 185-1 | 1.8 | 3.6 | — | Butyrolactone | 7 | Good | | — | CC, roll mill only |
| 14 | 187-1 | 3.5 | 7.0 | — | Butyrolactone | 14 | Good | | — | Predispersed BN |
| 15 | 188-1 | 2.5(4/1) | 5.0 | — | Butyrolactone | 20 | Very good | 3 | 500 | BN/CC(ox) |
| 16 | 191-1 | 2.5(4/1) | 7.0 | — | Butyrolactone | 19 | Very good | 3 | 500 | BN/CC(crosslink) |

$^I$Triton-X 100
$^{II}$Pluronic L105

FIG. 3 shows the relative viscosity data for various binders such as CMC, PAA and VAGH. FIG. 3a displays the increase of viscosity with the addition of carbon fibrils.

In addition to their rheological properties, other properties such as coating quality, resistivity, and conductivity were evaluated for the Table 1 samples. For coating quality, a doctor blade was used to coat the samples onto either MYLAR or aluminum foil sheets. In addition to MYLAR and aluminum foil, other substrates capable of physically carrying The use of CAB results in a viscosity profile that closely matches the viscosity profile of Acheson A435. See FIG. 6.

A brief description of Examples 1-16 as listed in Table 2 is provided below. For each of the inks, coatings on both MYLAR film and aluminum foil were made by doctor blade as described above. Due to the increased binder solution viscosity, air bubbles were found to be easily trapped inside the ink. Direct coating with this kind of ink will leave many pinholes. A degas procedure in a vacuum for two to three hours can significantly remove these air bubbles and result in nearly defect-free fibril coatings.

EXAMPLE 1

The polymeric binder and liquid vehicle were first prepared by mixing 10 grams of cellulose acetate butyrate with 90 grams of γ butyrolactone on a hot plate with a stir bar at 60° C. until the binder had completely dissolved. After dissolution of the CAB, a clear light yellow solution was obtained. 1.5 grams of dry CC carbon fibrils, 30 grams of the binder/solvent solution, 0.2 grams of surfactant, and an additional 68.3 grams of γ butyrolactone were mixed in a 250-ml beaker. The mixture was then sonicated with a probe sonicator at 450 W. The sonication continued until a gel-like slurry was obtained. A triple roll mill was then used to mill the ink, and the ink was finally filtered through a 500 mesh filter. Sample 156-1 contained 1.5 parts of carbon fibrils, 4.0 parts of CAB, 0.2 parts of surfactant and 95.3 parts of solvent

EXAMPLE 2

An electroconductive ink with mixed plain CC carbon fibrils and oxidized CC carbon fibrils was made using the procedure described in Example 1. However, the carbon fibrils were not predispersed. Sample 156-2 contained 0.9 parts of plain carbon fibrils, 0.9 parts of oxidized carbon fibrils, 3.6 parts of CAB, 0.2 parts of surfactant, and 95.4 parts of solvent.

EXAMPLE 3

Example 3 had a composition similar to that of Example 1; however, the formulation a higher solids content which resulted in increased viscosity. The rheological characteristics of sample 157-1 surpassed that of commercial carbon ink Acheson.

EXAMPLE 4

This sample was prepared in accordance with the process set forth in Example 1 but contained only oxidized CC carbon fibrils. Both lower ink conductivity and viscosity were observed.

EXAMPLE 5

This sample was similar to that of Example 1 except that plain CC carbon fibrils at a lower concentration was used.

EXAMPLES 6 AND 7

These samples were prepared in the same manner as set forth in Example 1, but instead of using CC carbon fibrils, BN carbon fibrils were used.

EXAMPLES 8 AND 9

These samples were similar to those of Examples 6 and 7 except that sonication was not used at all during the batching of the ink. Only milling was used to disperse the carbon fibrils. It was observed that the resistivity was reduced when the formulating process excluded sonication.

EXAMPLES 10 AND 11

These samples were prepared in accordance with Example 1 but different ratios of BN carbon fibrils to binder were used. The BN carbon fibril to binder ratios of samples 178-1, 173-1 and 178-2 were 1/2, 1/3, and 1/4 respectively.

EXAMPLE 12

This sample was a repeat of the inks used in Examples 8 and 9 with detailed sampling after each pass of a triple roll mill. It was determined that the coating conductivity became more consistent if the inks were passed through the triple roll mill four or five times. Despite the consistent coating conductivity, there were still pinholes present in the coatings.

EXAMPLE 13

This sample was the same as Example 12 except that plain CC carbon fibrils were substituted for the BN carbon fibrils.

EXAMPLE 14

This sample was the same as Example 12 except that the BN carbon fibrils used were predispersed in water (0.5% concentration). The predispersion was done to improve the cohesion of the BN fibrils and reduce pinholes. However, no significant improvement in coating quality was observed.

EXAMPLE 15

This sample was the same as Example 12 except that oxidized CC carbon fibrils were used in conjunction with the BN carbon fibrils at a ratio of BN/CC(ox) of 4 to 1. Although pinholes in the coatings still existed, there was improved coating quality because less pinholes were observed than in the previous BN alone samples.

EXAMPLE 16

This sample is used plain CC carbon fibrils in conjunction with BN carbon fibrils at a ratio of BN/CC of 4 to 1. The coating quality of this sample was markedly improved and had good electrical conductivity.

FIG. 7 shows scanning electron microscope samples for the various Examples. In general, all CC carbon fibril ink coatings were of a better quality than BN carbon fibril ink coatings. Inks containing pure BN fibrils tend to have pinhole defect possibly due to low cohesion of undispersed BN fibril aggregates. Sonication does improve dispersion but most BN fibrils still aggregated with particle sizes of about 0.5~2 μm. BN carbon fibril coatings can be improved by the addition of CC and oxidized CC fibrils.

FIG. 8 shows sheet resistivity as a function of fibril to binder ratio. FIG. 9 depicts how the resistivity changes when the carbon fibrils used as the electroconductive filler is CC as opposed to BN. The BN based inks typically have greater resistivities than their CC counterparts.

FIGS. 9 and 10 show how sheet resistivity changes as the number of passes in a triple roll mill increases. The inks in FIG. 9 have BN carbon fibrils as their filler whereas the inks in FIG. 10 have CC carbon fibrils as their filler.

Table 3 sets forth the contact resistance for the various samples. The contact resistance was measured by using the two-probe method described earlier. The contact resistance was estimated from the difference of the two values obtained by the probes assuming zero resistance across the aluminum foil and thin coating.

TABLE 3

| Example | Sample | Filler | F/B | Coating Thickness (mil) | Resistance on MYLAR (/sq) | (/sq)/mil | Resistance on Al (/sq) | (/sq)/mil | Estimated contact R |
|---|---|---|---|---|---|---|---|---|---|
| 5 | 168-1 | CC | 1/2 | 0.16 | 61 | 10 | 16 | 5 | 8 |
|   | 168-2 | CC | 1/4 | 0.22 | 99 | 22 | 26 | 8 | 14 |
| 4 | 164-1 | CC(ox) | 1/2 | 0.30 | 95 | 28 | 78 | 23 | 127 |
| 14 | 187-1 | BN | 1/2 | 0.31 | 73 | 22 | 23 | 7 | 10 |
| 15 | 188-1 | BN/CC(ox) | 1/2 | 0.29 | 70 | 20 | 38 | 11 | 25 |
| 16 | 191-1 | BN/CC | 1/2.8 | 0.34 | 58 | 19 | 23 | 8 | 13 |
| Benchmark | PF407A | Carbon | 1/1 | 1.2 | 7 | 8 | 0.6 | 0.7 | 0.8 |
| 16 | 191-1 | BN/CC | 1/2.8 | 0.34 | 58 | 19 | $1.0^1$ | $0.3^1$ | $0.3^1$ |
| 16 | 191-1 | BN/CC | 1/2.8 | 0.34 | 58 | 19 | $0.8^2$ | $0.3^2$ | $0.3^2$ |

[1] Coating made on COER film (carbon coated Al foil)
[2] Coating made on PF407A coating on Al foil.

From the results set forth in Table 3, it is observed that plain fibril inks create better contacts to aluminum than oxidized fibril inks. Furthermore, combining plain fibrils and oxidized fibrils result in an increase of contact resistance. Coatings of higher F/B ratios have better contact to aluminum foil.

In order to improve the contact resistance of the inks on the foil, some of the foil samples were first treated with an acid. Table 4 sets forth the effect of acid treatments on contact resistance.

TABLE 4

| Example | Sample | Acid treatment | Coating Thickness (mil) | Resistance on MYLAR (/sq) | (/sq)/mil | Resistance on Al (/sq) | (/sq/mil) | Estimated Contact R |
|---|---|---|---|---|---|---|---|---|
| 16 | 191-1 | No | 0.34 | 58 | 19 | 23 | 8 | 13 |
| 16 | 191-1 | Yes |  |  |  | 19 | 6 | 9 |
|  | 191-2 | No | 0.36 | 51 | 18 | 19 | 7 | 11 |
|  | 191-2 | Yes |  |  |  | 13 | 5 | 6 |
|  | 191-4 | No | 0.27 | 50 | 13 | 10 | 3 | 3 |
|  | 191-4 | Yes |  |  |  | 6 | 2 | 2 |
| 4 | 164-1 | No | 0.30 | 95 | 28 | 78 | 23 | 127 |
| 4 | 164-1 | Yes |  |  |  | 45 | 13 | 24 |

From Table 4, it is shown that acid pre-treatments do lower the contact resistance. Once this was established, tests were conducted with different acid pretreatments to determine the impact of acid type. Three acids were used for pretreatment: sulfuric acid, hydrochloric acid and nitric acid. Table 5 shows the effect of these different acids. Nitric acid appeared to have the greatest effect in reducing contact resistance.

TABLE 5

| Acid | Resistance on Mylar (/sq) | (/sq)/mil | Resistance on Al (/sq) | (/sq/mil) | Estimated Contact R |
|---|---|---|---|---|---|
| $H_2SO_4$ | 58 | 19 | 21 | 7 | 11 |
| HCl | 58 | 19 | 16 | 5 | 8 |
| $HNO_3$ | 58 | 19 | 19 | 6 | 6 |

Another method to improve the contact resistance was to add a carbonaceous material to the filler. For example, graphite or carbon black can be added. The extra carbonaceous material can be introduced whenever the carbon fibrils are introduced during the batching of the inks.

Tables 6 and 7 show the effects of adding graphite and carbon black respectively.

TABLE 6

| Example | Sample | Graphite (%) | Coating Thickness (mil) | Resistance on Mylar | | Resistance on Al | | Estimated Contact R |
| --- | --- | --- | --- | --- | --- | --- | --- | --- |
| | | | | (Ω/sq) | (Ω/sq)/mil | (Ω/sq) | (Ω/sq/mil) | |
| 16 | 191-1 | 0 | 0.34 | 58 | 19 | 23 | 8 | 13 |
| | 191-2 | 5.3 | 0.36 | 51 | 18 | 19 | 7 | 11 |
| | 191-3 | 10.0 | 0.27 | 62 | 17 | 14 | 4 | 5 |
| | 191-4 | 18.2 | 0.27 | 50 | 13 | 10 | 3 | 3 |
| | PF407A | | 1.2 | 7 | 8 | 0.6 | 0.7 | 0.8 |

TABLE 7

| Example | Sample | CB (%) | Coating Thickness (mil) | Resistance on Mylar | | Resistance on Acid cleaned Al | | Estimated Contact R |
| --- | --- | --- | --- | --- | --- | --- | --- | --- |
| | | | | (Ω/sq) | (Ω/sq)/mil | (Ω/sq) | (Ω/sq/mil) | |
| 16 | 191-1 | — | 0.34 | 58 | 19 | 19 | 6 | 9 |
| | 7-1 | 5 | 0.26 | 64 | 16 | 7 | 2 | 2 |
| | 7-2 | 10 | 0.38 | 39 | 15 | 8 | 3 | 3 |

From Tables 6 and 7, it can be seen that carbon black is more effective than graphite in improving electrical contact. A carbon black content of 5% appears to make the contact resistance of the fibril based ink closest to that of the Acheson PF407.

The effect of curing conditions on the contact resistance was also studied. Table 8 shows the effects of different drying conditions on Example 16. In order to reduce the contact resistance as much as possible, the inks should be cured at temperatures between 40° C. and 80° C.

TABLE 8

| Drying Condition | Coating Thickness (mil) | Resistance on Mylar | | Resistance on Al | | Estimated Contact R |
| --- | --- | --- | --- | --- | --- | --- |
| | | (Ω/sq) | (Ω/sq/mil) | (Ω/sq) | (Ω/sq/mil) | |
| 25° C. (vacuum) | 0.30 | 96 | 29 | 62 | 21 | 76 |
| 45° C. | 0.33 | 60 | 19 | 18 | 6 | 9 |
| 65° C. | 0.34 | 58 | 19 | 23 | 8 | 13 |
| 85° C. | 0.28 | 74 | 20 | 22 | 7 | 11 |
| 180° C. | — | — | 20* | 36 | 12 | 30 |

*Applying data at 85° C.

In addition to evaluating the fibril inks for their contact resistance, the inks were also evaluated for their adhesion to various substrate. In order to make this evaluation, the inks were coated on different substrates such as aluminum and MYLAR. Cellophane tape was applied to the coating and pressurized in order to remove all air bubbles. The cellophane tape was peeled away from the coated substrate, and the coating was visually inspected. If there was no damage to the coating, then it was deemed to have had good adhesion. All of the samples in Table 2 were tested for their adhesion.

The results indicated that plain fibril ink had better adhesion to substrates than oxidized fibrils. The sequence of adhesion strength was Example 5>Example 14>Example 16>Example 15>Example 4. Furthermore, by pre-treating aluminum foil with acid, the adhesion is further improved.

The samples of Table 2 were also tested for their rheological properties to determine how closely they resembled the commercial carbon ink products. The use of CAB as the binder allowed for greater viscosities than were achieved for VAGF and VAGH. Table 9 sets forth the solids contents for various types of carbon fibrils used in conjunction with CAB. The table also lists the solid contents of the formulations for each carbon fibril that results in an ink with viscosity similar to that of commercial carbon inks. Although the carbon fibril inks has viscosity profiles similar to that of commercial carbon inks, the rheological properties remained different. The viscosity profiles are shown in the graphs of FIG. 11. For example, at zero shear, carbon fibril-based inks do not flow or relax as easily as to commercial carbon inks. This is evidenced when a Brookfield viscometer is turned off. For commercial carbon ink, the remaining torque on the spindle of the viscometer can return to zero rather quickly (approximately after twenty to twenty-five seconds) whereas the viscometer does not easily return back to zero torque for carbon fibril-based inks. These differences are shown in the graphs of FIG. 12.

TABLE 9

| Carbon fibril Type | Solids Content |
| --- | --- |
| plain CC | ~5% to ~6% |
| oxidized CC | ~6% to ~7.5% |
| BN | ~7% to ~9% |

Screen Printing

The electroconductive inks of the present invention can be formulated such that they can be applied to various substrates.

The principle methods of application include, but are not limited to, screen printing, spraying, dipping, slot coating or brushing. Any convenient or known manner of applying the inks to a substrate can be used. If screen-printing is used, it can be accomplished by hand or by a printer.

If while screen printing, phase segregation arises, then the segregation manifests itself as defects in the printer pattern. This effect of phase segregation can be rectified by multiple passes of printing. For example, for hand screen-printing three-coatings can be done.

FIG. 13 shows the screen-printing results of a 200-mesh screen. As shown in FIG. 13, more coating passes of a fibril based ink are necessary in order to replicate the thickness of a commercial carbon ink. For example, 3½ coatings of Example 4 are necessary to achieve approximately 50% of the thickness of a single coat of Acheson PF407A.

Electroconductive Paper

The inks of the present invention can be applied to porous media with retention of porosity. Table 10 sets forth four samples of electroconductive ink made with oxidized carbon fibrils. Included in this table are the physical and electrical properties as well as composition. Each of the samples listed in Table 10 were made by dispersing carbon fibrils in water first. Any additional excipients are subsequently added.

TABLE 10

| | Composition (%) | | | | | | Resistivity | |
|---|---|---|---|---|---|---|---|---|
| Sample | Fibril | Water | EG | SS | DIOP | V (Cps) | t (μm) | $\rho_{sur}$ (Ω-cm) | $\rho$ (Ω-cm) |
| Run A | 2 | 98 | | | | 0 | 2.5 | 200-300 | .05 |
| Run B | 4 | 96 | | | | 19.2 | | | |
| Run C | 2.5 | 77.5 | 20 | | | 0 | | | |
| Run D | 2.5 | 77.17 | 20 | 0.03 | 0.3 | 0 | | 35000 | .05 |

The formation of thin fibril films with these compositions can be done by both printing and dip coating. Text and patterns have printed with an EPSON ribbon printer on ordinary cellulosic paper. The surface resistivity of printed pattern was measured about $3.5 \times 10^5$ Ω/cm (Example 20). The thickness of the pattern is in the range of few tens of nanometers. This thickness corresponds to a few layers of fibrils. Papers with ~2.5 mm fibril coatings on each side have been prepared by dip-coating. The measured surface resistivity for the coated paper e.g., cellulose paper, is between 200-300 Ω/cm. Bulk resistivity of the fibril coating is ~0.05 Ω/cm, a number very close to that measured for a free standing fibril mat. Furthermore the adhesion of fibril films to paper is excellent because of the strong interaction between functional groups on the fibril surface and groups associated with cellulose paper.

A pound of oxidized fibrils can coat $5 \times 10^5$ m² paper with 1-2 μm thick fibril film, which corresponds to ten million letter size (8½×11 in.) paper sheets. The fibril film thickness will be ~1-2 μm. The surface resistivity of the paper will be ~500 Ω/cm. To dissipate any static charge and get the required resistivity of $10^6$ Ω/cm, a coating with few layers of fibrils~tens of nanometers thick will suffice.

EXAMPLE 17

Two ink samples, 18-3 and 185-1, were used to make freestanding electroconductive membranes. This membrane can be applied as current collectors for batteries and energy devices. A doctor blade was used to make a uniform coating of the said ink on a siliconized release paper. The gap setting is 8-mil. Multiple passes can create membranes with different thickness. The coating was then dried in a conventional oven at 60-80° C. for 4 hours. A flexible thin membrane can be easily obtained after being peeled off the release paper. Visual observation indicated no pinholes present in the membrane. The resistivities of these membranes measured using the four-point probe method is shown in Table 11.

TABLE 11

| Sample | Coating Pass | Thickness (μm) | Resistivity (ohm-cm) |
|---|---|---|---|
| 18-4 | 2 | 12 | 0.08 |
| 185-1 | 1 | 6 | 0.03 |

EXAMPLE 18

Electroconductive inks of the present invention have been used to fashion field emission cathodes (see W. J. Zhao, N. Kawakami, A. Sawada and M. Takai, "Field emission from screen-printed carbon nano tubes irradiated by tunable UV laser in different atmospheres", *the 15th International Vacuum Microelectronics Conference*, Jul. 7-11, 2002, Lyon, France, OB4.08. and M. Takai, "Surface Modification of Screen-Printed Carbon-Nanotube Emitters for Large-Diagonal FEDs," SID 2003 International Symposium, May 20-22, 2003, Baltimore, Md., 18.1). The several different ink formulations used to prepare field emission cathodes are shown in the Table 12. Aluminized glass slides were prepared as conductive substrates for the cathodes. 50 mm×50 mm×1.0 mm glass slides were coated on one side with 20 nm of chromium followed by 250 nm of aluminum in a Balzers MED-010 vacuum evaporator. The electroconductive ink was deposited on the aluminum surface as rows of squares with the square size increasing from row to row from 0.5 mm to 8 mm. The pattern was formed by first masking the aluminum surface with a metal foil shadow mask with cutouts for the patterns of squares and using a Badger airbrush to spray the electroconductive ink uniformly over the surface of the foil mask. The airbrush was a commercial artist's airbrush with nitrogen regulated to 40 psi as the compressed gas feed for the airbrush. After spraying the ink over the surface of the foil mask, the ink was dried, either by heating in an oven or placing the glass slide with the attached mask onto a hot plate. When the ink had dried to form the electroconductive coating the foil mask was carefully removed leaving the pattern of squares of electroconductive coating where the cutouts in the mask had been. The relative mixture of air and ink as well as the total rate of flow could be adjusted with the dual action airbrush to obtain a uniform ink film over the surface.

TABLE 12

Ink Formulations for Field Emission Cathodes (in 100 ml H$_2$O)

| Lots | CC/BN (gm) | Acrylic (xp-9901) | Surfynol CT324 |
|---|---|---|---|
| 64-01 | Ox. BN (1.3) | 0.1 gm | 0 |
| 66-02 | Ox. CC (1.0) | 0.1 gm | 0 |
| 55-03 | Plain CC (1.0) | 0 | 1.5 gm |
| 79-04 | Plain CC (0.75) | 1.0 gm | 0 |
| 79-06 | Plain BN (1.0) | 0.75 gm | 0 |

A diode structure with a spacer of 150 microns was used to measure the emission current. The electron emission pattern was observed through a phosphor screen in on the ITO/glass substrate that acts as the anode (area 5×5 mm) in the diode structure. The spacer between the anode and the cathode is so thin that the electron emission area would be the same size as the anode size. Measurements were conducted in an ultra high vacuum chamber ($5.3 \times 10^{-8}$ Pa). The cathodes were characterized by increasing the applied voltage and recording the to current and the emission pattern. Field emission behavior was verified by plotting the current and voltage characteristics using the methods of Fowler and Nordheim. The onset of emission current for the cathodes prepared with the inks of Table 18 was typically less than 5 V/micron and as low as 1 V/micron.

What is claimed is:

1. An electroconductive ink comprising:
   carbon nanotubes; and
   a liquid vehicle;
   wherein said electroconductive ink has a viscosity from about 1 to about 50,000 cps and a thixotropic index value from about 1.0 to about 10.

2. The ink of claim 1, wherein said liquid vehicle is a nonhydrocarbon polar organic solvent.

3. The ink of claim 1, wherein said liquid vehicle is selected from the group consisting of carbitol, carbitol acetate, butyl carbitol, butyl carbitol acetate, butyrolactone, acetone, methyl ethyl ketone, cyclohexanone, dibasic ester solvent, diglyme, high boiling alcohols, alcohol esters, and water.

4. The ink of claim 1, wherein said liquid vehicle has a boiling point from about 150° C. to 200° C.

5. The ink of claim 1, wherein said carbon nanotubes are in the form of aggregates.

6. The ink of claim 1, wherein said carbon nanotubes are oxidized multiwall carbon nanotubes.

7. The ink of claim 1, further comprising a polymeric binder.

8. The ink of claim 7, wherein said polymeric binder is selected from the group consisting of vinyl chloride, vinyl acetate, hydroxyalkyl acrylate, vinyl alcohol, cellulose acetate butyrate, hydroxylethyl cellulose, carboxylmethyl cellulose, acrylic-based polymers, and combinations thereof.

9. An electroconductive ink comprising:
   carbon nanotubes; and
   a liquid vehicle;
   wherein said electroconductive ink has a viscosity from about 1 to about 80,000 cps and a thixotropic index value from about 1.0 to about 1.5.

10. The ink of claim 9, wherein said liquid vehicle is a nonhydrocarbon polar organic solvent.

11. The ink of claim 9, wherein said liquid vehicle is selected from the group consisting of carbitol, carbitol acetate, butyl carbitol, butyl carbitol acetate, butyrolactone, acetone, methyl ethyl ketone, cyclohexanone, dibasic ester solvent, diglyme, high boiling alcohols, alcohol esters, and water.

12. The ink of claim 9, wherein said liquid vehicle has a boiling point from about 150° C. to 200° C.

13. The ink of claim 9, wherein said carbon nanotubes are in the form of aggregates.

14. The ink of claim 9, wherein said carbon nanotubes are oxidized multiwall carbon nanotubes.

15. The ink of claim 9, further comprising a polymeric binder.

16. The ink of claim 15, wherein said polymeric binder is selected from the group consisting of vinyl chloride, vinyl acetate, hydroxyalkyl acrylate, vinyl alcohol, cellulose acetate butyrate, hydroxylethyl cellulose, carboxylmethyl cellulose, acrylic-based polymers, and combinations thereof.

17. An electroconductive ink comprising:
   0.1 to 5 wt. % carbon nanotubes;
   0.1 to 10 wt. % polymeric binder; and
   a liquid vehicle, wherein said electroconductive ink has a viscosity from about 1 to about 80,000 cps and a thixotropic index value from about 1.0 to about 10.

18. The ink of claim 17, wherein said ink comprises:
   a greater wt. % of carbon nanotubes than polymeric binder.

19. The ink of claim 17, wherein said carbon nanotubes are oxidized carbon nanotubes.

20. The ink of claim 17, wherein said ink has a viscosity from about 1 to about 50,000 cps and a thixotropic index value from about 1.0 to about 1.5.

* * * * *